US011009665B2

(12) United States Patent
Ott

(10) Patent No.: US 11,009,665 B2
(45) Date of Patent: May 18, 2021

(54) MULTI-FIBER FIBER OPTIC CONNECTION SYSTEM WITH FLEXIBLE, INSERTABLE PINS

(71) Applicant: CommScope Technologies LLC, Hickory, NC (US)

(72) Inventor: Michael James Ott, Chaska, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 22 days.

(21) Appl. No.: 16/245,667

(22) Filed: Jan. 11, 2019

(65) Prior Publication Data

US 2019/0235174 A1    Aug. 1, 2019

Related U.S. Application Data

(63) Continuation of application No. 13/715,176, filed on Dec. 14, 2012, now Pat. No. 10,215,926.
(Continued)

(51) Int. Cl.
*G02B 6/38* (2006.01)

(52) U.S. Cl.
CPC ............ *G02B 6/38* (2013.01); *G02B 6/3885* (2013.01); *G02B 6/389* (2013.01); *G02B 6/3825* (2013.01);
(Continued)

(58) Field of Classification Search
CPC .. G02B 6/3885; G02B 6/3825; G02B 6/3897; G02B 6/3893; G02B 6/3882
See application file for complete search history.

(56) References Cited

U.S. PATENT DOCUMENTS

| 5,408,558 A | 4/1995 | Fan |
| 5,420,954 A | 5/1995 | Swirhun et al. |

(Continued)

FOREIGN PATENT DOCUMENTS

| CN | 1451982 A | 10/2003 |
| EP | 0 670 507 A1 | 9/1995 |

(Continued)

OTHER PUBLICATIONS

Ryton® PPS (PolyPhenylene Sulfide) Specifications, http://www.boedeker.com/ryton_p.htm, 2 pages (Copyright 2011).
(Continued)

*Primary Examiner* — Thomas A Hollweg
*Assistant Examiner* — Mary A El-Shammaa
(74) *Attorney, Agent, or Firm* — Merchant & Gould P.C.

(57) ABSTRACT

A flexible pin for use in a male fiber optic connector is flexible both in bending and radially to accommodate variations in fiber optic ferrules of the male fiber optic connector and a female fiber optic connector. The flexibility may accommodate angular errors of the male and the female fiber optic connectors. The flexibility may also accommodate diametral errors of the flexible pin of the male fiber optic connector and diametral errors in a pin hole of the female fiber optic connector. The flexibility is sufficient that a connector spring or spring clamp can mate mating faces of the male and the female fiber optic connectors with the errors present. In certain embodiments, the flexible pin is a removable pin that includes a latch. The removable pin can be installed and removed from a fiber optic connector without disassembling a ferrule from a connector housing of the fiber optic connector.

20 Claims, 21 Drawing Sheets

Related U.S. Application Data

(60) Provisional application No. 61/570,654, filed on Dec. 14, 2011.

(52) U.S. Cl.
CPC ....... *G02B 6/3893* (2013.01); *Y10T 29/49826* (2015.01)

(56) References Cited

U.S. PATENT DOCUMENTS

| | | | |
|---|---|---|---|
| 5,596,662 | A | 1/1997 | Boscher |
| 5,611,010 | A | 3/1997 | Shiino |
| 5,778,123 | A | 7/1998 | Hagan et al. |
| 5,845,028 | A | 12/1998 | Smith |
| 5,920,670 | A | 7/1999 | Lee |
| 5,923,803 | A | 7/1999 | Bunin et al. |
| 6,146,024 | A | 11/2000 | Melchior |
| 6,357,933 | B1 | 3/2002 | Bradley |
| 6,425,692 | B1 | 7/2002 | Fujiwara |
| 6,520,686 | B1 | 2/2003 | Kiani |
| 6,619,855 | B2 | 9/2003 | Dudoff |
| 6,702,479 | B2 | 3/2004 | Yang |
| 6,755,574 | B2 | 6/2004 | Fujiwara |
| 6,805,493 | B2 | 10/2004 | Igl et al. |
| 6,910,812 | B2 | 6/2005 | Pommer et al. |
| 7,296,935 | B1 | 11/2007 | Childers |
| 8,016,491 | B2 | 9/2011 | Takaoka |
| 8,585,300 | B2 | 11/2013 | Buijs et al. |
| 8,768,125 | B2 | 7/2014 | Beatty et al. |
| 9,274,287 | B2 | 3/2016 | Takano et al. |
| 9,417,406 | B2 | 8/2016 | Isenhour et al. |
| 9,470,852 | B2 | 10/2016 | Takano et al. |
| 9,720,182 | B2 | 8/2017 | Childers |
| 9,829,646 | B2 | 11/2017 | Watte et al. |
| 10,162,126 | B2 | 12/2018 | Elenbaas |
| 10,203,457 | B2 | 2/2019 | Lu et al. |
| 10,215,926 | B2 | 2/2019 | Ott |
| 10,591,679 | B2 | 3/2020 | Elenbaas |
| 2002/0050716 | A1 | 5/2002 | Cresswell |
| 2002/0114589 | A1 | 8/2002 | Igl et al. |
| 2002/0150347 | A1 | 10/2002 | Fujiwara |
| 2002/0186932 | A1 | 12/2002 | Barnes et al. |
| 2003/0012516 | A1 | 1/2003 | Matsumoto |
| 2003/0091297 | A1 | 5/2003 | Hung et al. |
| 2003/0098045 | A1 | 5/2003 | Loder |
| 2003/0161584 | A1 | 8/2003 | Ohtsuka et al. |
| 2004/0120654 | A1 | 6/2004 | Kevern |
| 2005/0180702 | A1 | 8/2005 | Kevern |
| 2005/0249465 | A1 | 11/2005 | Kevern |
| 2005/0286833 | A1 | 12/2005 | Kramer |
| 2006/0013538 | A1 | 1/2006 | Hodge et al. |
| 2009/0052844 | A1 | 2/2009 | Van Der Steen |
| 2010/0291794 | A1* | 11/2010 | Luo .............. H01R 31/005 439/502 |
| 2011/0044589 | A1 | 2/2011 | Takaoka et al. |
| 2011/0262075 | A1 | 10/2011 | Beatty et al. |
| 2012/0014649 | A1 | 1/2012 | Duis et al. |
| 2012/0201499 | A1 | 8/2012 | Buijs et al. |
| 2012/0257860 | A1 | 10/2012 | Li et al. |
| 2012/0328244 | A1 | 12/2012 | Sasaki et al. |
| 2013/0170797 | A1 | 7/2013 | Ott |
| 2013/0266268 | A1 | 10/2013 | Li et al. |
| 2015/0168655 | A1 | 6/2015 | Isenhour et al. |
| 2015/0198773 | A1 | 7/2015 | Nakama et al. |
| 2016/0187591 | A1 | 6/2016 | Fortusini et al. |
| 2016/0252682 | A1 | 9/2016 | Watte et al. |
| 2016/0313511 | A1 | 10/2016 | Childers |
| 2017/0307828 | A1 | 10/2017 | Elenbaas |
| 2017/0343741 | A1 | 11/2017 | Coenegracht et al. |
| 2017/0363816 | A1 | 12/2017 | Elenbaas |
| 2018/0156983 | A1 | 6/2018 | Watte et al. |
| 2018/0156986 | A1 | 6/2018 | Lu et al. |
| 2019/0146161 | A1 | 5/2019 | Elenbaas |
| 2019/0196119 | A1 | 6/2019 | Lu et al. |

FOREIGN PATENT DOCUMENTS

| | | | |
|---|---|---|---|
| JP | 7-318761 | A | 12/1995 |
| JP | 2014-77919 | A | 5/2014 |
| WO | 00/70381 | A1 | 11/2000 |
| WO | 02/088810 | A1 | 11/2002 |

OTHER PUBLICATIONS

Satake, T. et al., "MPO-type single-mode multi-fiber connector: Low-loss and high-return-loss intermateability of APC-MPO connectors," Optical Fiber Technology, vol. 17, pp. 17-30 (2011).

* cited by examiner

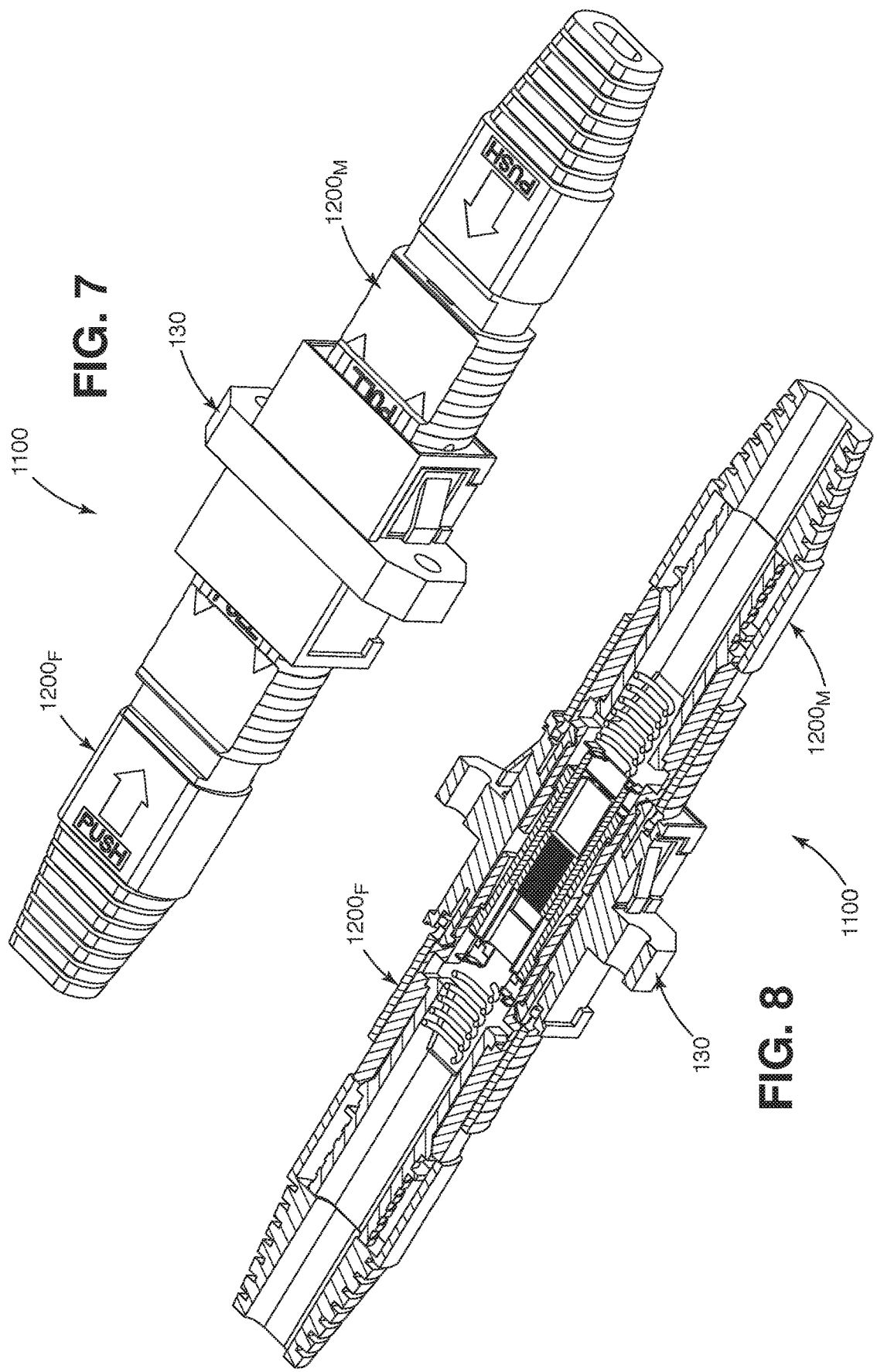

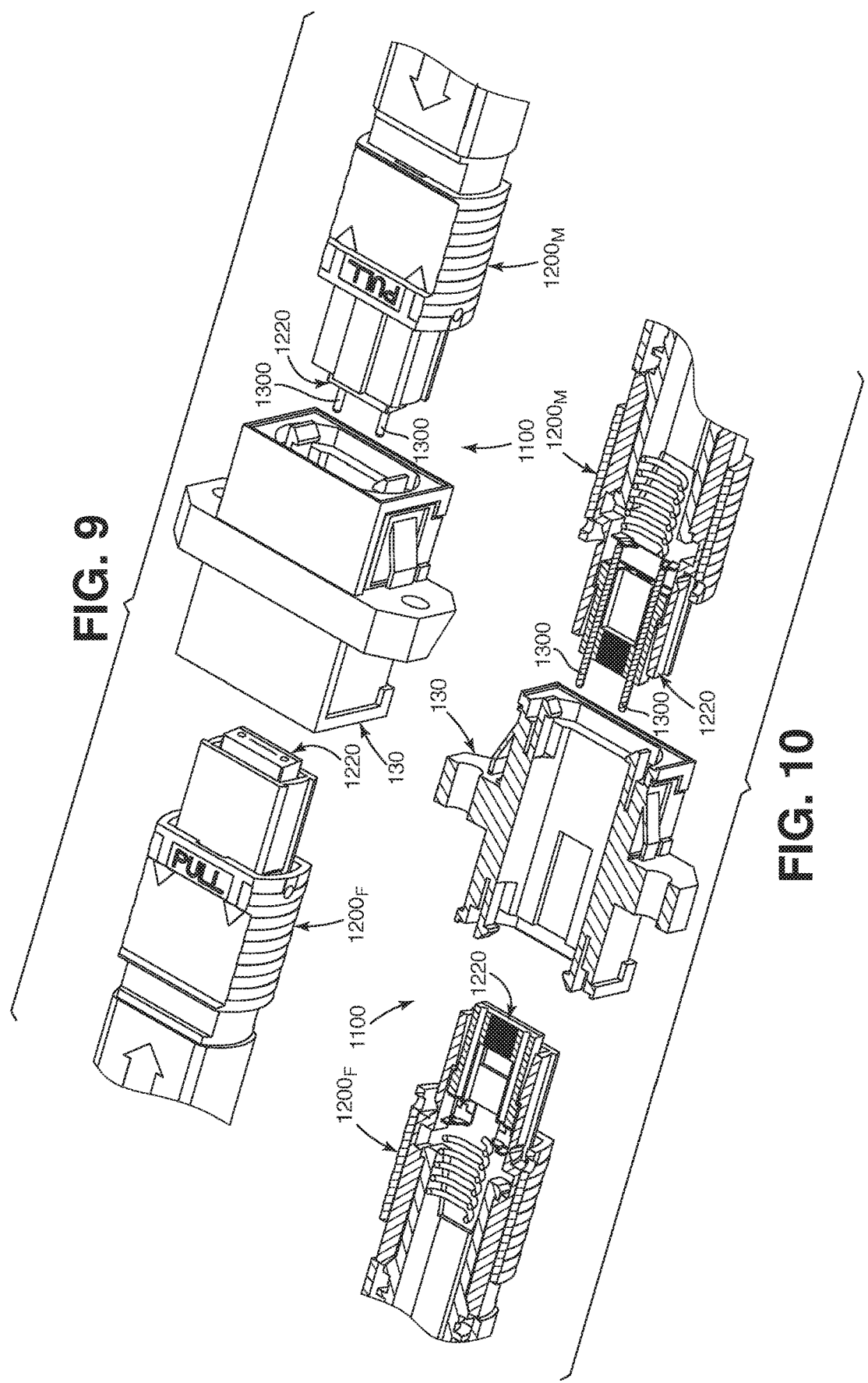

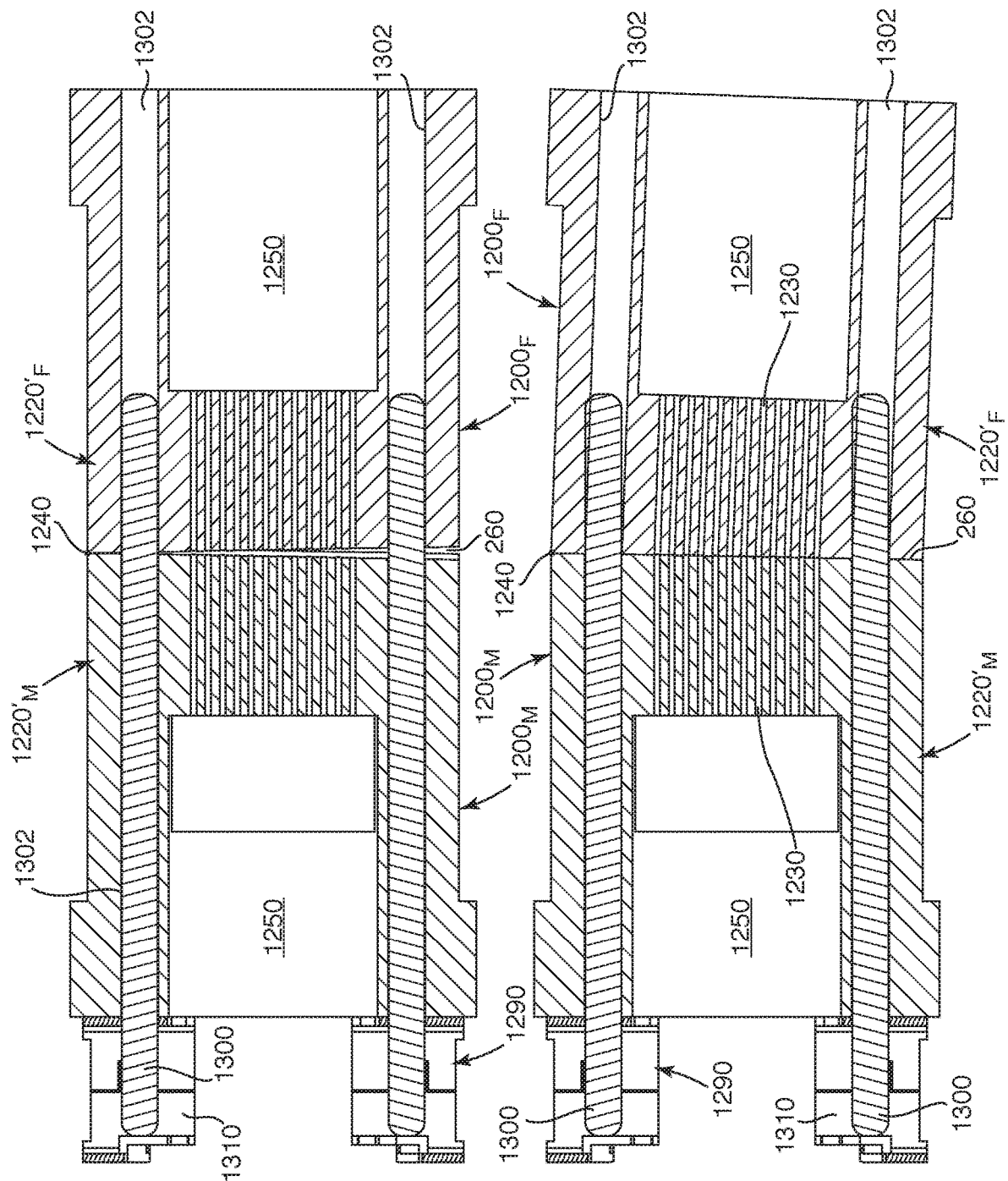

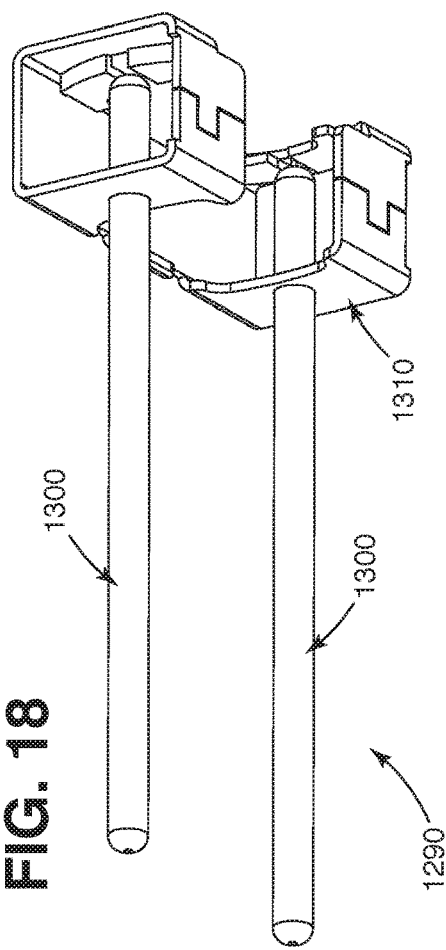
FIG. 18
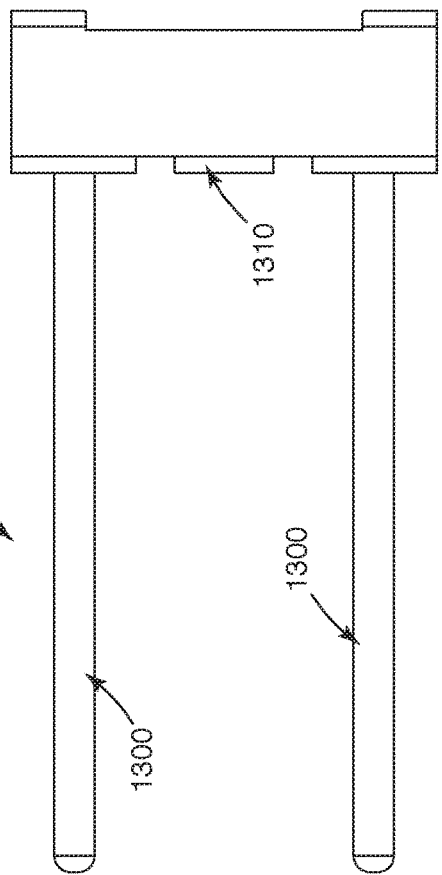
FIG. 19
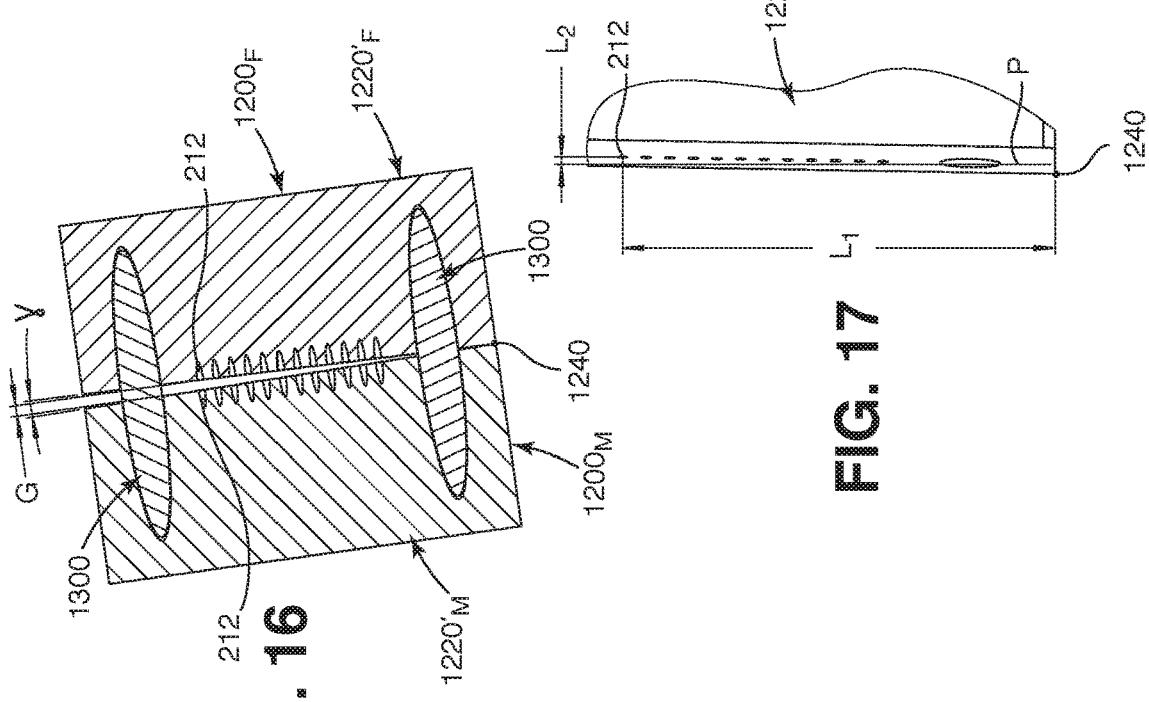
FIG. 16
FIG. 17

FIG. 30
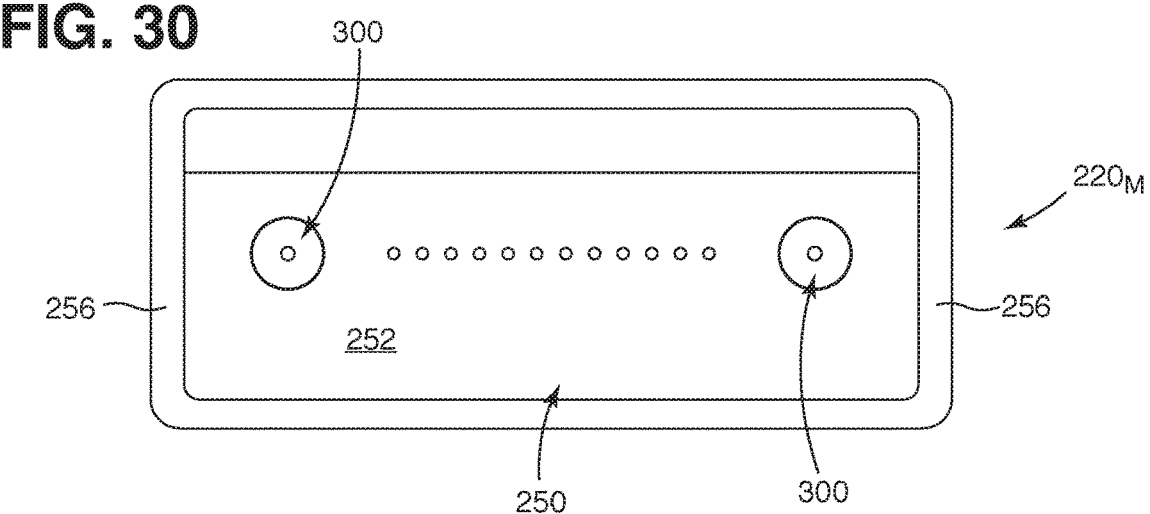
FIG. 31
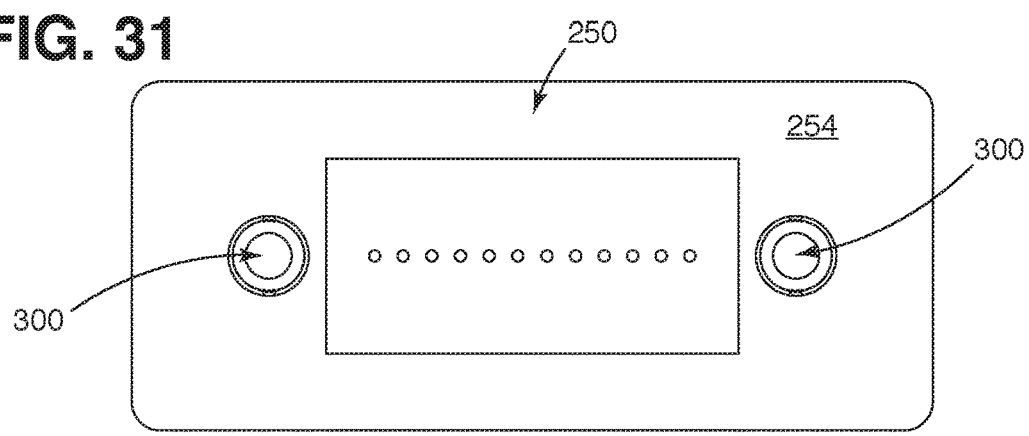
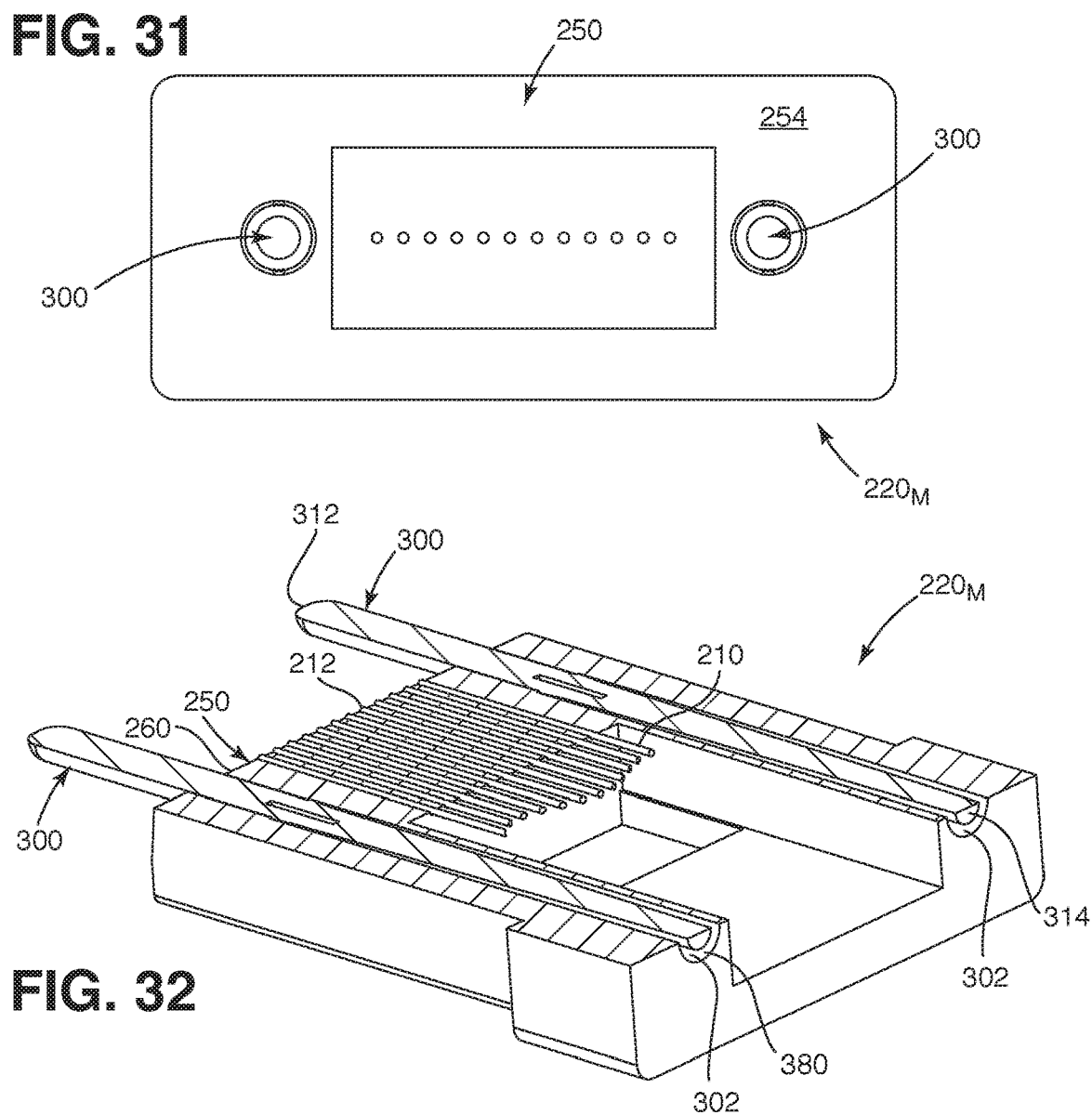
FIG. 32

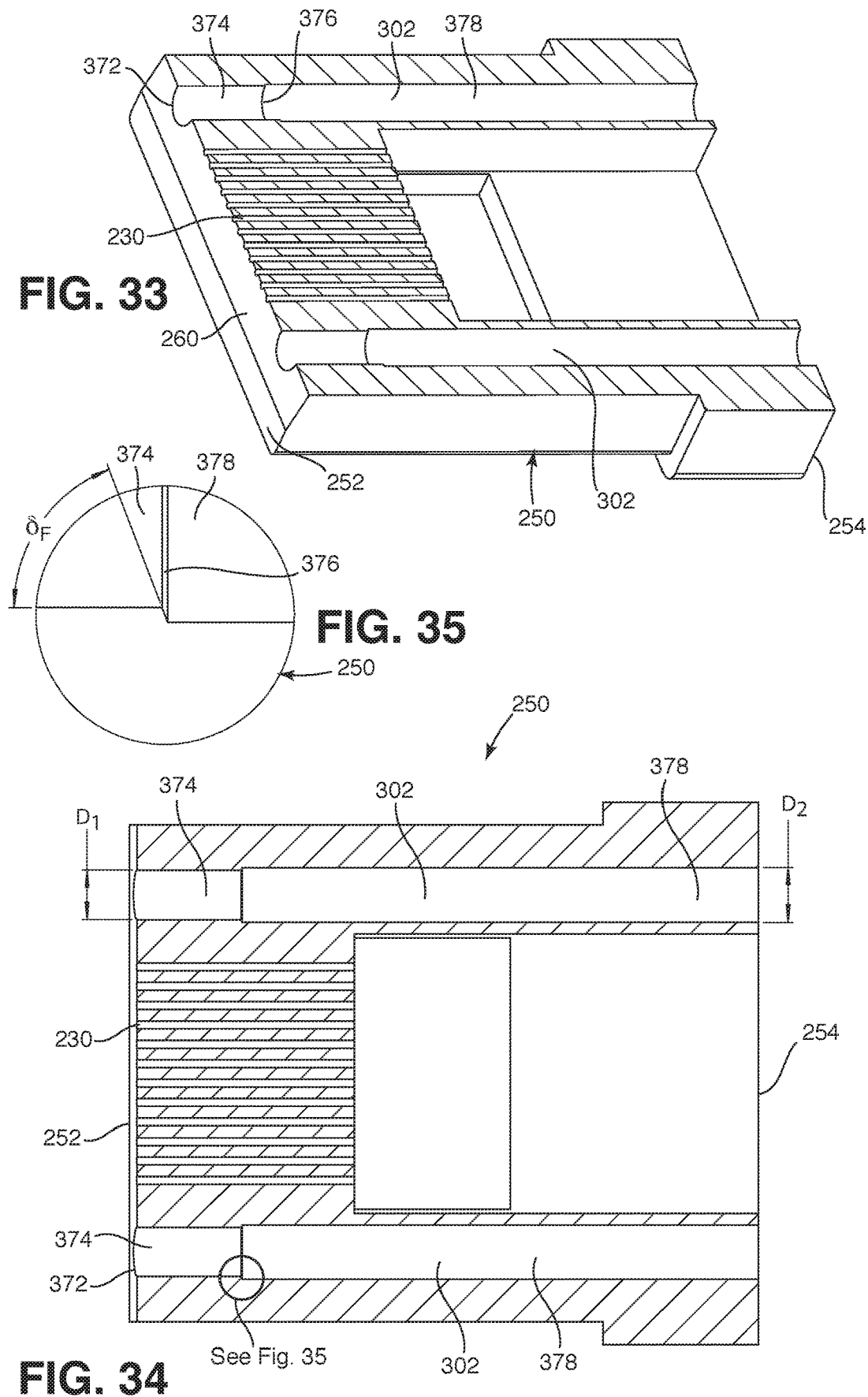

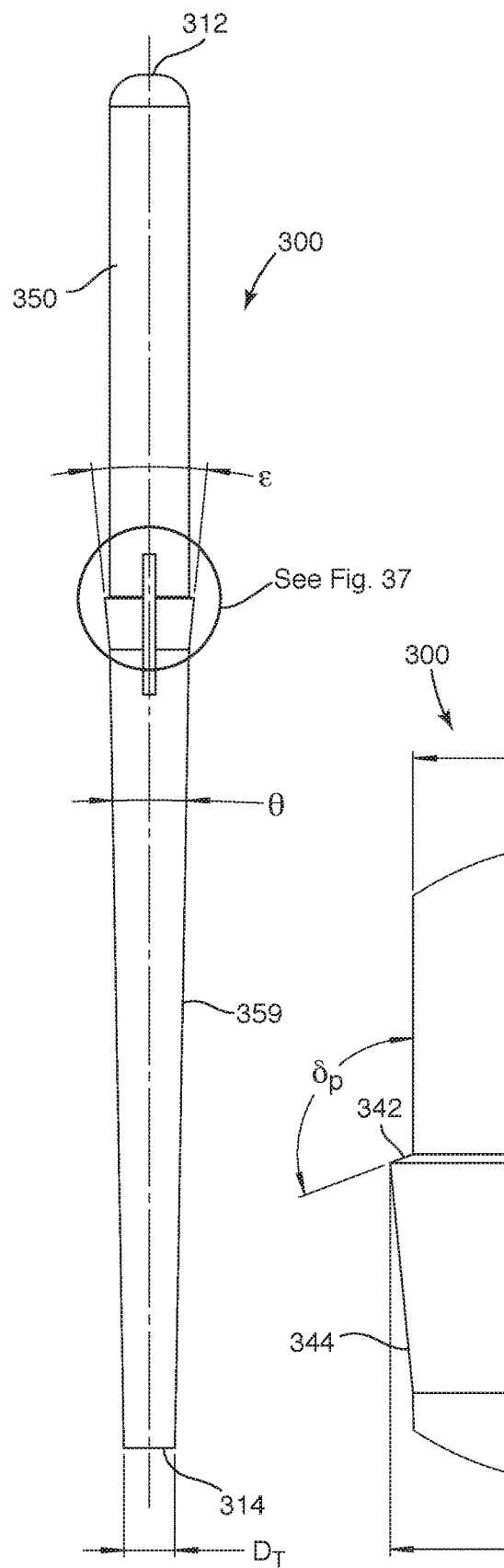
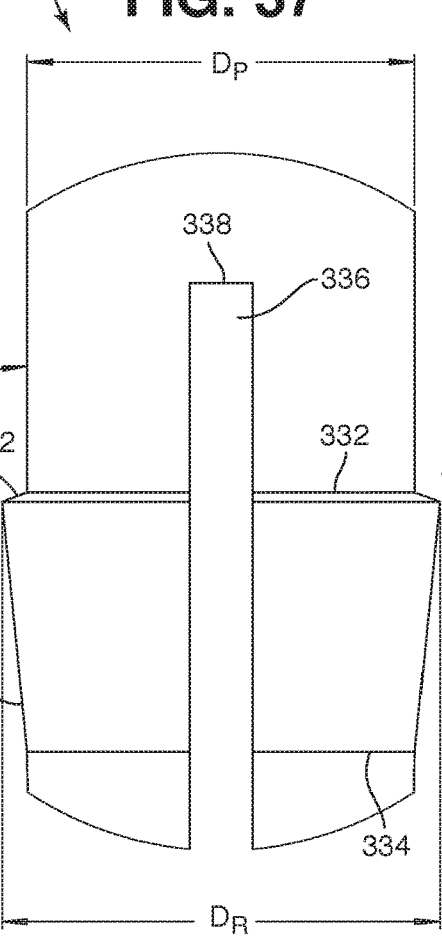
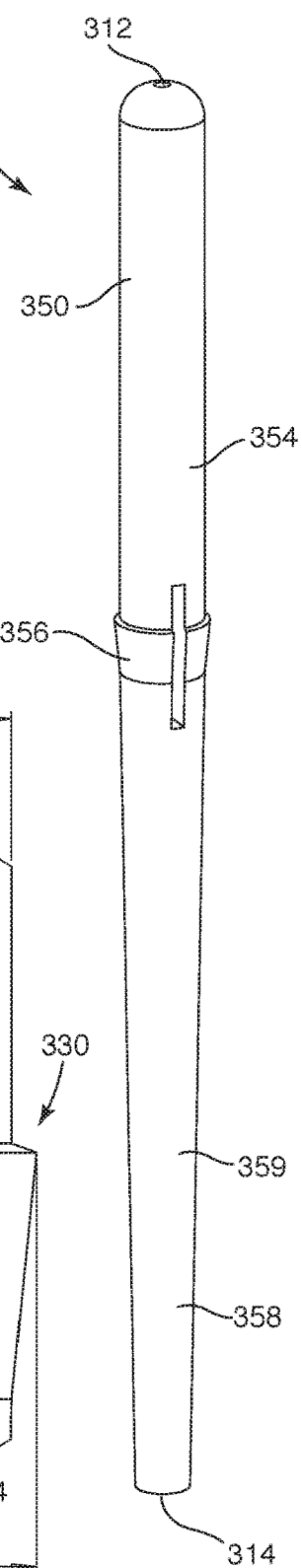
FIG. 36
FIG. 37
FIG. 38

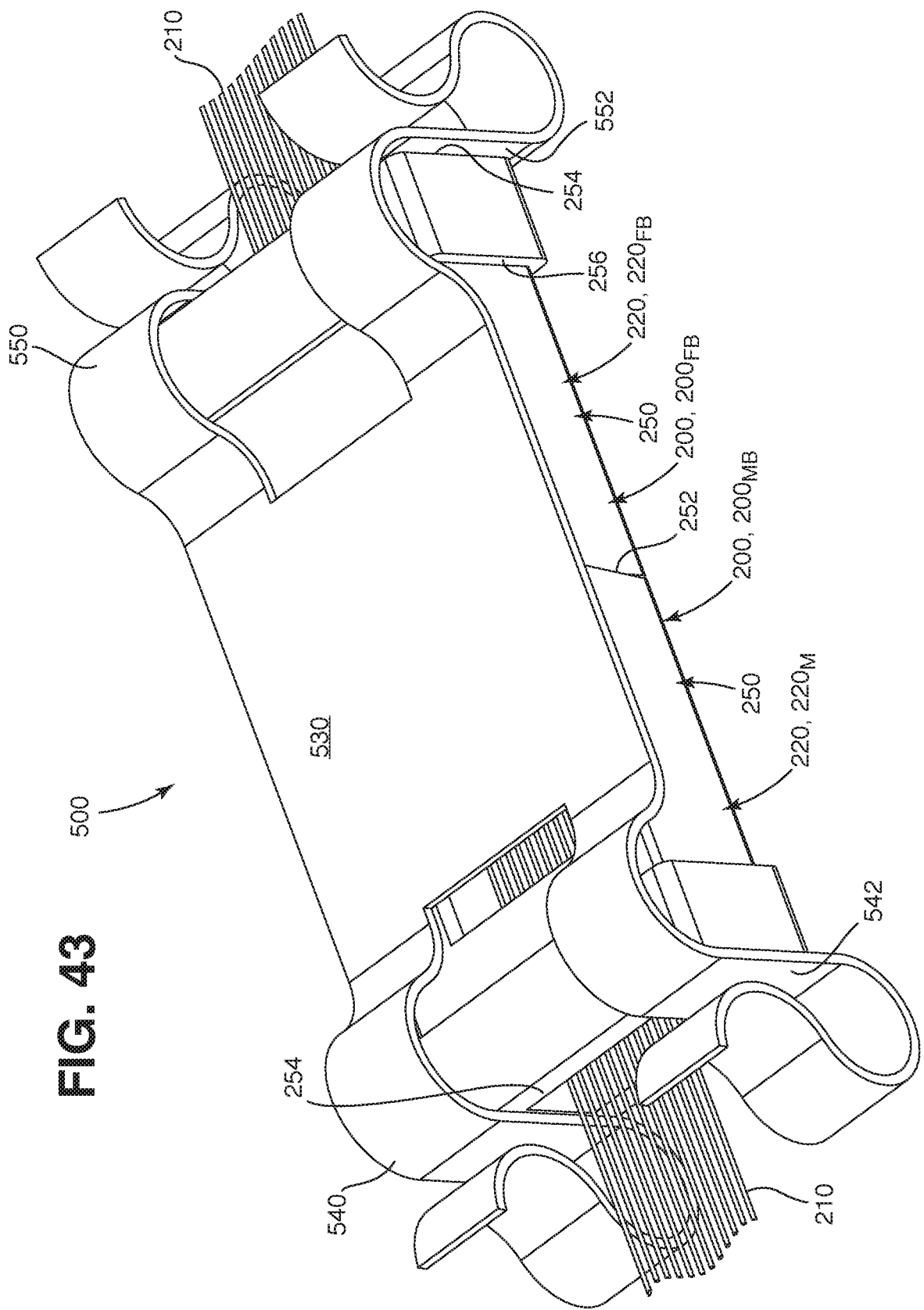

MULTI-FIBER FIBER OPTIC CONNECTION SYSTEM WITH FLEXIBLE, INSERTABLE PINS

CROSS-REFERENCE TO RELATED APPLICATION

This application is a continuation of U.S. patent application Ser. No. 13/715,176, filed Dec. 14, 2012, now U.S. Pat. No. 10,215,926, which application claims the benefit of U.S. Provisional Patent Application Ser. No. 61/570,654, filed Dec. 14, 2011, the disclosures of each of which are hereby incorporated by reference in their entirety.

BACKGROUND

A fiber optic connector is typically used to terminate an end of an optical fiber. A multi-fiber fiber optic connector is typically used to terminate multiple ends of multiple optical fibers. Such fiber optic connectors may include a ferrule (e.g., an MT ferrule). Such ferrules can be made of plastic, metal, ceramic, or a combination of plastic, metal, and/or ceramic. The ferrule holds the end or the ends of the optical fiber or the optical fibers and may be bonded to the optical fiber or the optical fibers (e.g., using epoxy). Such fiber optic connectors position the end or the ends of the optical fiber or the optical fibers relative to another fiber optic component (e.g., another fiber optic connector) in order to establish an optical signal connection with losses below a specified limit.

Certain of the multi-fiber fiber optic connectors position the ends of the multiple optical fibers in a row (i.e., a row of the fiber ends). Two of the multi-fiber fiber optic connectors can be connected together using a multi-fiber fiber optic adapter (e.g., an MPO fiber optic adapter). The multi-fiber fiber optic adapter receives and holds the two multi-fiber fiber optic connectors which can each terminate an end of a fiber optic cable. One approach to aligning a first and a second of the two multi-fiber fiber optic connectors to each other is by using a pin-in-hole approach. For example, the first multi-fiber fiber optic connector is inserted into the multi-fiber fiber optic adapter, and the second multi-fiber fiber optic connector is inserted into the multi-fiber fiber optic adapter such that the row of the fiber ends of the first multi-fiber fiber optic connector faces a corresponding row of the fiber ends of the second multi-fiber fiber optic connector. A pair of metal pins, residing along the row of the fiber ends of the first multi-fiber fiber optic connector extends outward in a direction parallel to the optical fibers of the first multi-fiber fiber optic connector. The metal pins are located and held in a first ferrule of the first multi-fiber fiber optic connector. As the second multi-fiber fiber optic connector is inserted into the multi-fiber fiber optic adapter, the pair of the metal pins is inserted into a corresponding pair of holes residing along the corresponding row of the fiber ends of the second multi-fiber fiber optic connector and thereby positions the two multi-fiber fiber optic connectors relative to each other. After the ends of the optical fibers of the first multi-fiber fiber optic connector are aligned with the ends of the optical fibers of the second multi-fiber fiber optic connector, a light signal of the optical signal connection can pass between each pair of the aligned ends of the corresponding optical fibers.

Fiber optic cables which have two, four, eight, or twelve of the optical fibers are typically terminated using multi-fiber fiber optic connectors which configure the ends of the optical fibers into a single row configuration (e.g., a single row of two, four, eight or twelve fiber ends). Fiber optic cables which have 24 of the optical fibers are typically terminated in a double row configuration (e.g., two rows, with each of the rows having twelve fiber ends). Other fiber optic cables may be terminated in a configuration with three or more rows of fiber ends. In the single row configuration, the double row configuration, and other configurations, a pair of the metal pins, with one of the metal pins at each end of the single, double, or multiple row configurations, aligns the two multi-fiber fiber optic connectors relative to each other.

SUMMARY

An aspect of the present disclosure relates to providing a flexible pin in a male fiber optic connector. The flexible pin may be flexible both in bending and radially or may be flexible either in bending or radially to accommodate variations in fiber optic ferrules of the male fiber optic connector and a female fiber optic connector. The flexibility may accommodate angular errors of the male and/or the female fiber optic connectors. The flexibility may accommodate diametral errors of the flexible pin of the male fiber optic connector and/or diametral errors in a pin hole of the female fiber optic connector. The flexibility of the flexible pin is sufficient that a connector spring or spring clamp can mate mating faces of the male and the female fiber optic connectors with one or more errors present.

Another aspect of the present disclosure relates to a removable pin that includes a latch. The removable pin can be installed and removed from a multi-fiber fiber optic connector without disassembling a ferrule from a connector housing of the multi-fiber fiber optic connector.

Still another aspect of the present disclosure relates to a fiber optic connection system for optically connecting optical fibers. The fiber optic connection system includes a first fiber optic connector and a second fiber optic connector. The first fiber optic connector includes a first ferrule with a first mating face. The first ferrule is adapted to hold a first set of optical fibers with ends of the first set of optical fibers terminating at the first mating face of the first ferrule. The first ferrule includes at least one flexible pin that extends outwardly away from the first ferrule in a first direction that is away from the first mating face of the first ferrule. The second fiber optic connector includes a second ferrule with a second mating face. The second ferrule is adapted to hold a second set of optical fibers with ends of the second set of optical fibers terminating at the second mating face of the second ferrule. The second ferrule includes at least one pin hole that is adapted to receive the flexible pin of the first ferrule of the first fiber optic connector.

In certain embodiments, the first ferrule is adapted to position the first set of optical fibers along a first row. The flexible pin of the first ferrule may be positioned along the first row. The second ferrule may be adapted to position the second set of optical fibers along a second row. The pin hole of the second ferrule may be positioned along the second row. In certain embodiments, the at least one flexible pin includes a pair of the flexible pins, and the at least one pin hole includes a pair of the pin holes. In certain embodiments, the first ferrule is adapted to position the first set of optical fibers along a first row. The pair of the flexible pins of the first ferrule may be positioned along the first row with the flexible pins on opposite ends of the first row. The second ferrule may be adapted to position the second set of optical fibers along a second row, and the pair of the pin holes of the second ferrule may be positioned along the second row with the pin holes on opposite ends of the second row.

In certain embodiments, the first ferrule further includes a pin hole, and the second ferrule further includes a flexible pin. The pin hole of the first ferrule may be adapted to receive the flexible pin of the second ferrule. The first ferrule may be adapted to position the first set of optical fibers along a first row. The flexible pin and the pin hole of the first ferrule may be positioned along the first row on opposite ends of the first row. The second ferrule may be adapted to position the second set of optical fibers along a second row. The pin hole and the flexible pin of the second ferrule may be positioned along the second row on opposite ends of the second row.

In certain embodiments, at least one of the first and the second fiber optic connectors are interconnectable with an MPO fiber optic connector. The at least one of the first and the second fiber optic connectors may be interconnectable with the MPO fiber optic connector via an MPO fiber optic adapter. The at least one flexible pin may be removable from the first ferrule by pulling in the first direction on a portion of the flexible pin that extends outwardly away from the first ferrule. The first fiber optic connector may include a housing that houses at least a portion of the first ferrule, and the at least one flexible pin may be removable from the first ferrule without removing the first ferrule from the housing of the first fiber optic connector. The first ferrule may include a pin hole, and the flexible pin may be insertable into the pin hole of the first ferrule by pushing the flexible pin into the pin hole of the first ferrule in a second direction generally opposite the first direction.

In certain embodiments, the first fiber optic connector includes a housing that houses at least a portion of the first ferrule, and the at least one flexible pin is installable into the first ferrule without removing the first ferrule from the housing of the first fiber optic connector. The fiber optic connection system may further include a set of flexible pins. Each of the flexible pins of the set of flexible pins may include a mating portion that potentially interfaces with a mating portion of the pin hole of the second ferrule. The mating portions of the flexible pins of the set of flexible pins may vary in size. The flexible pin of the first ferrule may be selected from the set of flexible pins to match the size of the mating portion of the flexible pin of the first ferrule with a size of the mating portion of the pin hole of the second ferrule.

Still another aspect of the present disclosure relates to a multi-fiber ferrule for terminating optical fibers. The multi-fiber ferrule includes a ferrule body and a flexible pin. The ferrule body may extend between a first end and a second end. The first end of the ferrule body includes a mating face that is adapted to terminate ends of the optical fibers. The first end of the ferrule body also includes a pin hole. The flexible pin extends between a first end and a second end. The flexible pin is mounted within the pin hole of the ferrule body. The flexible pin has a retention feature for retaining the flexible pin within the pin hole, and the first end of the flexible pin extends outwardly away from the first end of the ferrule body.

Yet another aspect of the present disclosure relates to a fiber optic connection system for optically connecting optical fibers. The fiber optic connection system includes a first fiber optic connector and a second fiber optic connector. The first fiber optic connector includes a first ferrule with a first mating face. The first ferrule is adapted to hold a first set of optical fibers with ends of the first set of optical fibers terminating at the first mating face of the first ferrule. The first ferrule includes at least one plastic pin extending outwardly away from the first ferrule in a first direction away from the first mating face of the first ferrule. The second fiber optic connector includes a second ferrule with a second mating face. The second ferrule is adapted to hold a second set of optical fibers with ends of the second set of optical fibers terminating at the second mating face of the second ferrule. The second ferrule includes at least one pin hole adapted to receive the plastic pin of the first ferrule of the first fiber optic connector. The plastic pin deforms to accommodate imperfect geometry in at least one of the first fiber optic connector and the second fiber optic connector under a mating force of less than about 15 Newtons and thereby accommodate mating of the first and the second mating faces.

Still another aspect of the present disclosure relates to a method of connecting a first fiber optic connector to a second fiber optic connector. The method includes: providing the first and the second fiber optic connectors; inserting a flexible pin of the first fiber optic connector into a pin hole of the second fiber optic connector; mating mating faces of the first and the second fiber optic connectors together with a mating force of less than about 15 Newtons; and bending the flexible pin about an angle greater than 0.05 degree with the mating force.

Yet another aspect of the present disclosure relates to a method of connecting a first fiber optic connector to a second fiber optic connector. The method includes: providing the first and the second fiber optic connectors; inserting a flexible pin of the first fiber optic connector into a pin hole of the second fiber optic connector; mating mating faces of the first and the second fiber optic connectors together with a mating force of less than about 15 Newtons; and bending the flexible pin about a distance greater than 0.01 millimeter with the mating force.

Still another aspect of the present disclosure relates to a method of mating a mating face of a first fiber optic ferrule to a mating face of a second fiber optic ferrule. The mating face of at least one of the first and the second fiber optic ferrules includes an angular imperfection. The method includes: providing the first and the second fiber optic ferrules; inserting a flexible pin of the first fiber optic ferrule into a pin hole of the second fiber optic ferrule; mating the mating faces of the first and the second fiber optic ferrules together with a mating force of less than about 15 Newtons; and bending the flexible pin to accommodate the angular imperfection of 0.5 degree or less.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

FIG. 7 is a perspective view of the fiber optic connector assembly of FIG. 3 shown in a connected configuration;

FIG. 8 is the perspective view of FIG. 7 but with the fiber optic connector assembly cross-sectioned;

FIG. 9 is a partial perspective view of the fiber optic connector assembly of FIG. 3 shown in a disconnected configuration;

FIG. 10 is the perspective view of FIG. 9 but with the fiber optic connector assembly cross-sectioned;

FIG. 14 is a cross-sectional plan view of the assembly of FIG. 13 as called out at FIG. 13;

FIG. 15 is a cross-sectional plan view of the assembly of FIG. 13 similar to FIG. 14 but with mating faces of the ferrules mated together thereby creating an interference between pins of the male ferrule and pin holes of the female ferrule;

FIG. 16 is a cross-sectional view of the assembly of FIG. 13 as called out at FIG. 13;

FIG. 17 is an enlarged portion of FIG. 12;

FIG. 18 is a perspective view of a pin assembly of the male ferrule of FIG. 3;

FIG. 19 is a plan view of the pin assembly of FIG. 18;

FIG. 30 is a front view of the male ferrule of FIG. 20;

FIG. 31 is a rear view of the male ferrule of FIG. 20;

FIG. 32 is a perspective cross-sectional view of the male ferrule of FIG. 20;

FIG. 33 is a perspective cross-sectional view of a ferrule body of the male ferrule of FIG. 20 and/or a ferrule body of an alternative female ferrule;

FIG. 34 is a cross-sectional top plan view of the ferrule body of FIG. 33;

FIG. 35 is an enlarged portion of FIG. 34;

FIG. 36 is a top plan view of the pin of FIG. 25;

FIG. 37 is an enlarged portion of FIG. 36;

FIG. 38 is a perspective view of the pin of FIG. 25;

FIG. 42 is a front view of the pin of FIG. 41;

FIG. 43 is a perspective view of another fiber optic connector assembly according to the principles of the present disclosure, including a clamp spring, a male fiber optic connector, and a female fiber optic connector.

DETAILED DESCRIPTION

Figure 1:
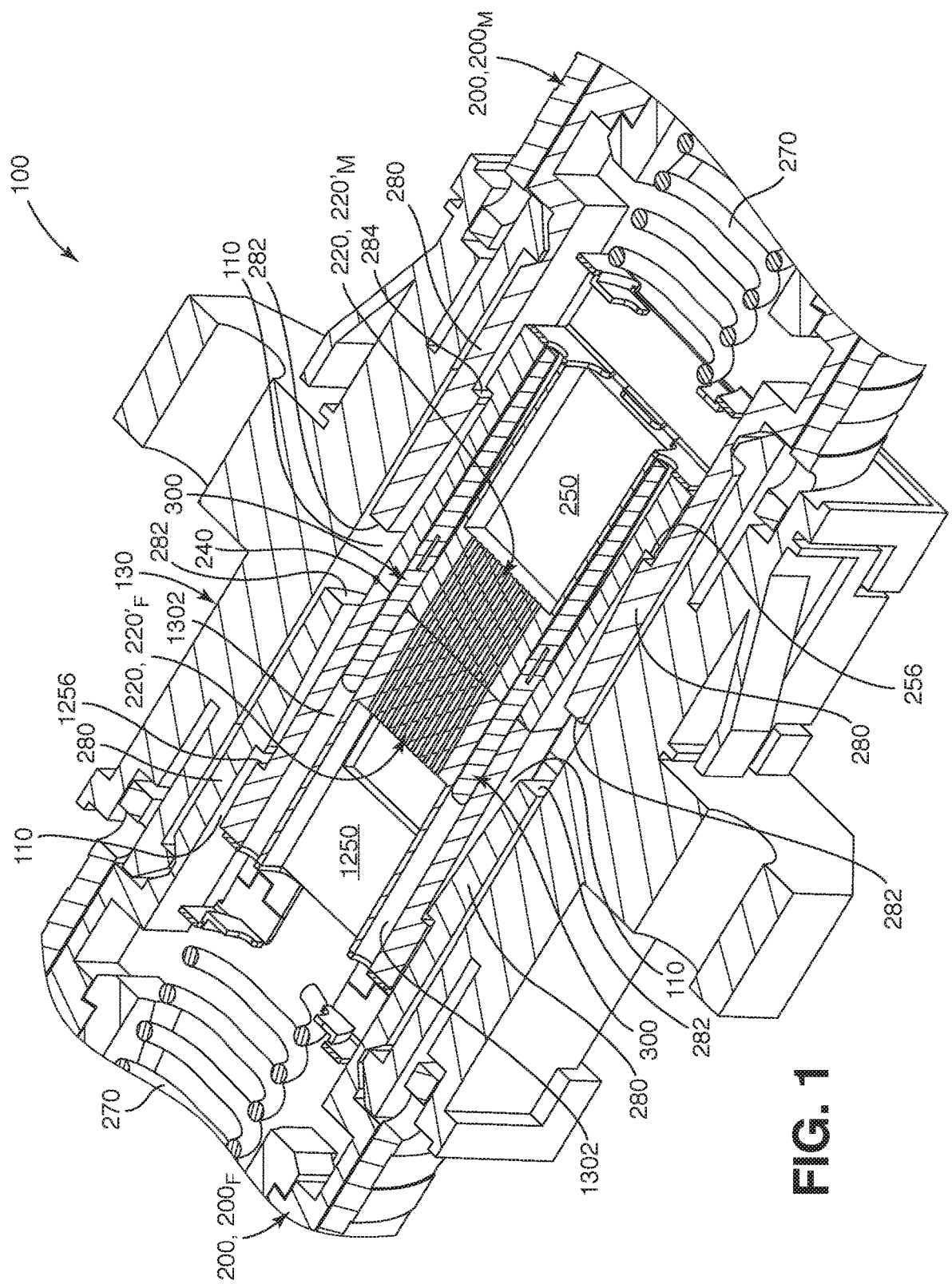
FIG. 1 is a partial perspective cross-sectional view of a fiber optic connector assembly according to the principles of the present disclosure, including a fiber optic adapter, a male fiber optic connector shown with an imperfect male ferrule, and a female fiber optic connector shown with an imperfect female ferrule.

Reference will now be made in detail to the exemplary aspects of the present disclosure that are illustrated in the accompanying drawings. Wherever possible, the same reference numbers will be used throughout the drawings to refer to the same or like structure.

According to the principles of the present disclosure, a fiber optic connector assembly 100, 500 includes at least one fiber optic ferrule 220 that is tolerant of imperfect ferrule geometry when establishing an optical connection between two fiber optic connectors 200. In an example embodiment, depicted at FIGS. 1 and 2, the fiber optic connector assembly 100 includes a fiber optic adapter 130, a male fiber optic connector $200_M$, and a female fiber optic connector $200_F$. In another example embodiment, depicted at FIGS. 43 and 44, the fiber optic connector assembly 500 includes a clamp spring 530, a male fiber optic connector $200_{MB}$, and a female fiber optic connector $200_{FB}$. As depicted, the male fiber optic connectors $200_M$, $200_{MB}$ and the female fiber optic connectors $200_F$, $200_{FB}$ are multi-fiber fiber optic connectors that include 12 optical fibers 210 (see FIGS. 32, 43, and 44). In other embodiments, the fiber optic connectors 200, $200_F$, $200_{FB}$, $200_M$, $200_{MB}$ may include more than or fewer than 12 of the optical fibers 210. The depicted fiber optic adapter 130, the depicted male fiber optic connector $200_M$, and the depicted female fiber optic connector $200_F$ are of the "MPO" style known in the art of fiber optic connection systems and are generally interconnectable and interchangeable with other gender appropriate "MPO" style fiber optic connectors 1200 and fiber optic adapters 130 (see FIGS. 3-10). The depicted male fiber optic connectors $200_M$, $200_{MB}$ and the depicted female fiber optic connectors $200_F$, $200_{FB}$ are or include "MT" style fiber optic ferrules 220, known in the art of fiber optic connection systems and are generally interconnectable and interchangeable with other gender appropriate "MT" style fiber optic ferrules 220, 1220.

According to the principles of the present disclosure, the at least one fiber optic ferrule 220 is tolerant of imperfect mating geometry when two of the fiber optic ferrules 220, 1220 are mated together. As will be described in detail below, the imperfect mating geometry can include imperfect spatial relationships between a mating face and pins and/or pin holes of the fiber optic ferrules 220, 1220. As will be described in detail below, the imperfect mating geometry can include imperfect spatial relationships between corresponding pins and pin holes of the fiber optic ferrules 220, 1220.

The multi-fiber fiber optic ferrules 220, 1220 typically include a ferrule body 250, 1250 with a mating face 260 (see FIGS. 11, 12, 20, 32, and 33). The ferrule body 250, 1250 may be made of a plastic such as polyphenylene sulfide. The ferrule body 250, 1250 may be glass reinforced, may include glass filled nodules, and/or may include a flexural modulus of about 1,000,000 psi. The mating face 260 is part of the mating geometry. The mating face 260 terminates ends 212 of the optical fibers 210 that are held by the respective ferrule body 250, 1250 (see FIG. 32). In certain embodiments, the ends 212 are flush with the mating face 260, and, in other embodiments, the ends 212 protrude slightly from the mating face 260. In still other embodiments, the ends 212 are recessed slightly in the mating face 260. In preferred embodiments, the ends 212 of the corresponding optical fibers 210 that are optically connected make physical contact with each other.

According to certain theories, one or more molecular interactions (e.g., weak molecular attraction, surface bonds, etc.) occur between mating surfaces of the ends 212 of the corresponding optical fibers 210 upon a certain mating pressure being applied in abutting the corresponding ends 212 against each other. The molecular interactions and/or other processes that occur between the abutted corresponding ends 212 improves light (i.e., photonic) transmission across the abutted ends 212. The improved light transmission may occur because of a minimization of changes in the index of refraction that would otherwise occur at the ends 212, index matching, compressive stresses, reduced reflection, etc., alone or in combination. The improved light transmission may occur because of other phenomena, alone or in combination, that occur at the ends 212 when they are compressed together. However, upon reaching a certain pressure, the ends 212 are susceptible to structural failure. It is therefore desired that the abutting contact pressure at the ends 212 be high enough to result in the improved light transmission but be low enough to avoid the structural failure.

Figure 5:
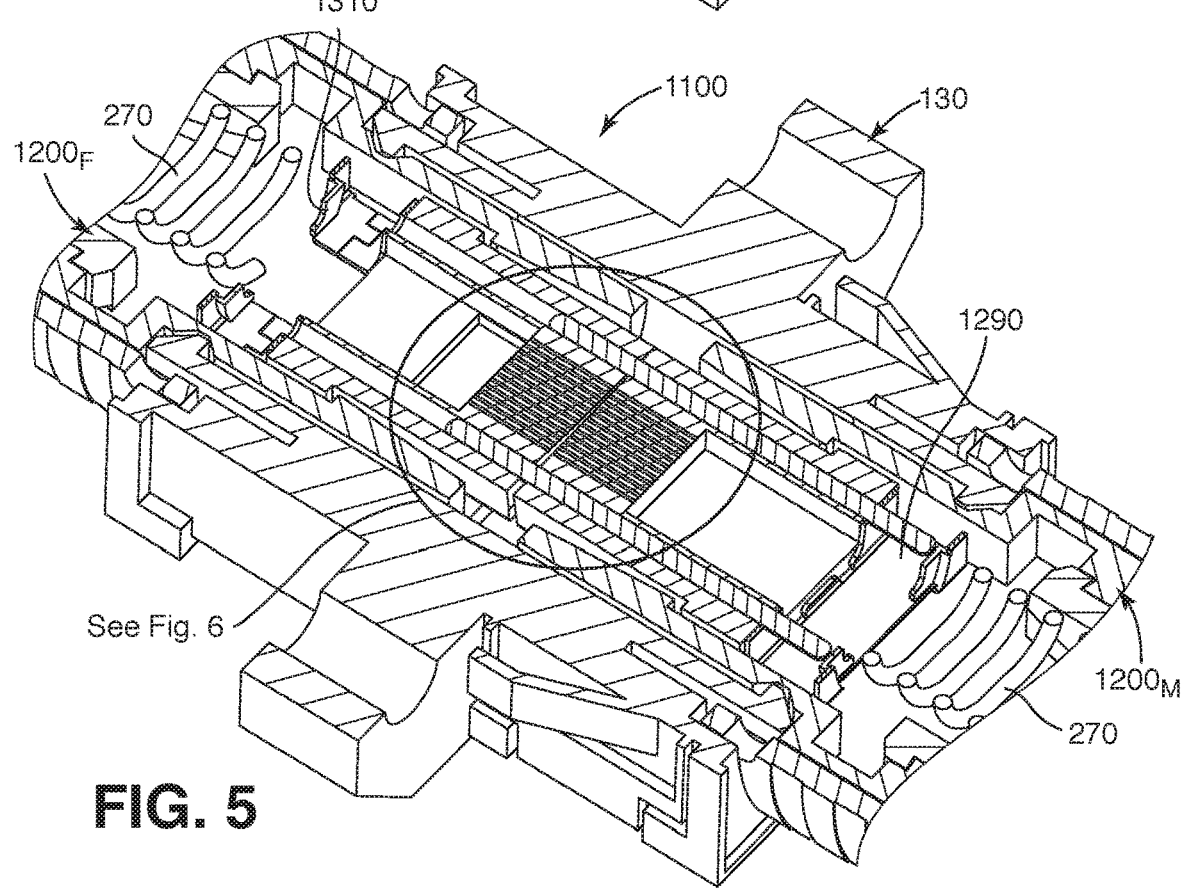
FIG. 5 is the partial perspective cross-sectional view of FIG. 3, but with at least one imperfect fiber optic ferrule.
Figure 4:
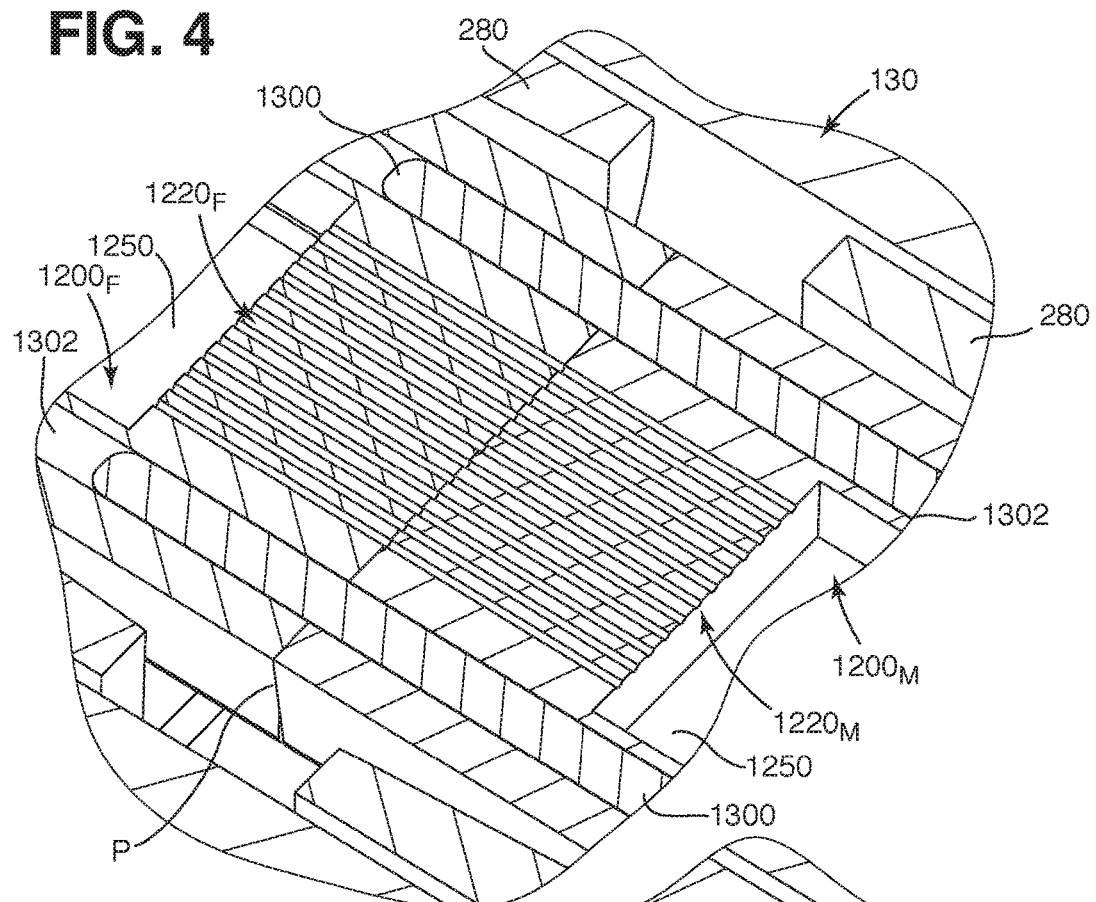
FIG. 4 is an enlarged portion of FIG. 3.
Figure 6:
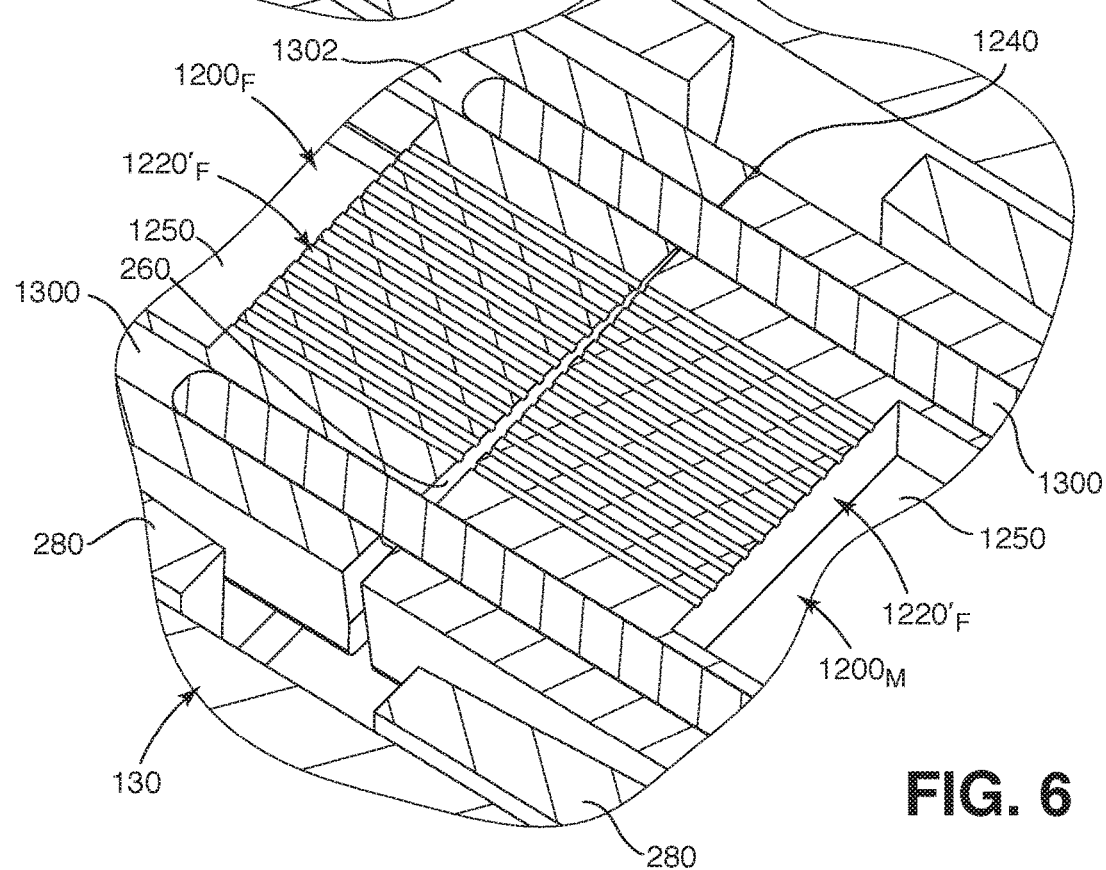
FIG. 6 is an enlarged portion of FIG. 5.
Figure 44:
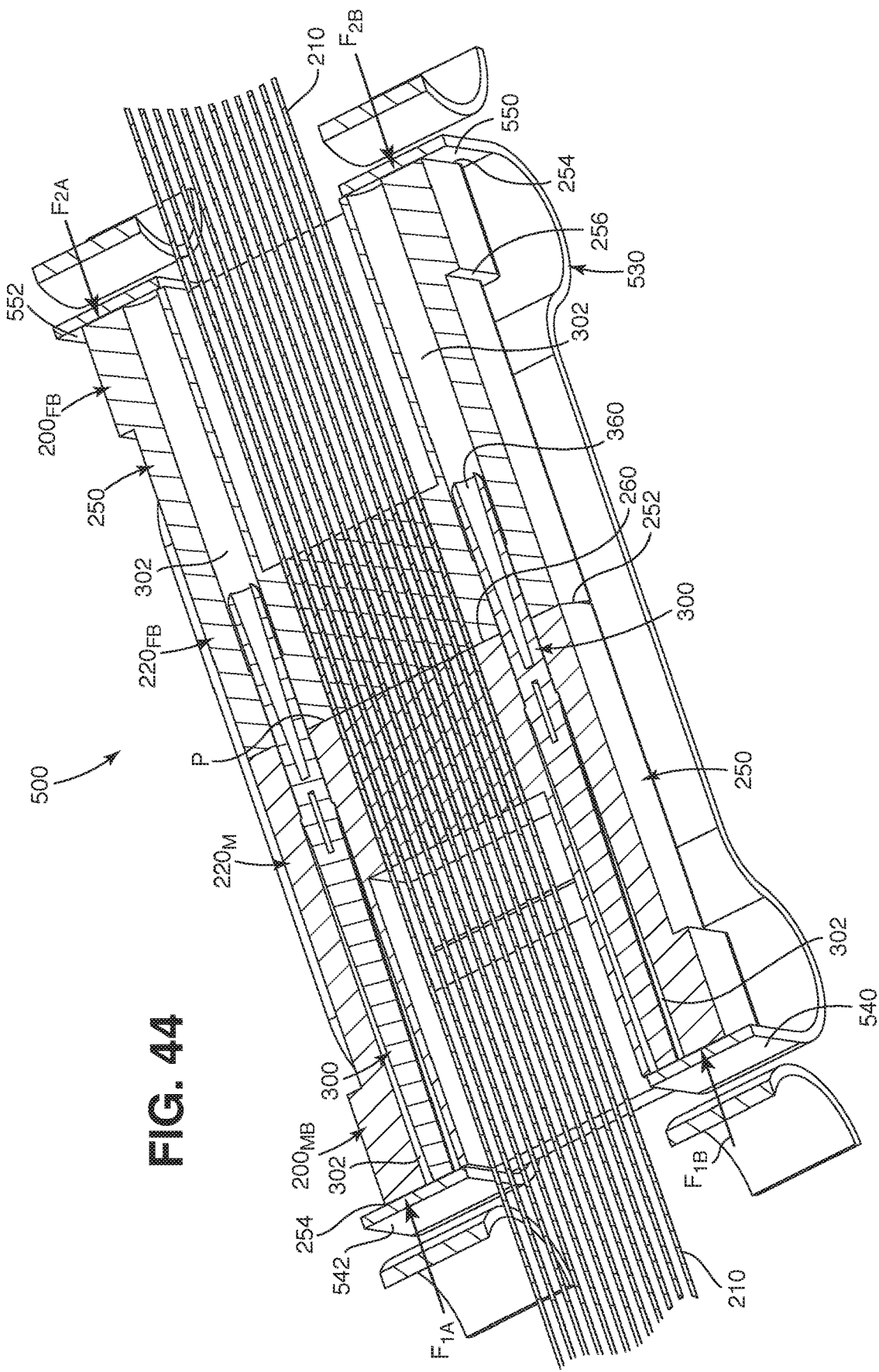
FIG. 44 is a cross-sectional perspective view of the fiber optic connector assembly of FIG. 43.

To make an optical connection between the optical fibers 210 of two of the ferrules 220, 1220 (e.g., a male ferrule $220_M$ and a female ferrule $220_F$), the mating faces 260 of the two ferrules 220, 1220 are mated together with the optical fibers 210 of the two ferrules 220, 1220 respectively aligned (see FIGS. 5 and 44). The mating faces 260 are typically planar and mate with each other at a mating plane P (see FIGS. 2, 4, and 44). In embodiments with slightly protruding ends 212 of the optical fibers 210, the ends 212 respectively contact each other generally at the mating plane P. To accurately align the respective optical fibers 210 when the respective mating faces 260 are mated, a pair of pins 300, 1300 can be inserted into a pair of pin holes 302, 1302 with the pair of the pins 300, 1300 extending across the mating plane P. The pins 300, 1300 and the pin holes 302, 1302 are part of the mating geometry. For example, as illustrated at FIG. 4, a pair of the pins 1300 is inserted into a pair of the pin holes 1302 across the mating plane P. As the optical fibers 210 are held by the respective ferrule bodies 250, 1250 and the ends 212 of the optical fibers 210 are positioned at the respective mating faces 260, the respective ends 212 are aligned and abutted together and able to transmit an optical signal across and between the respective optical fibers 210.

According to the principles of the present disclosure, the pin 300 of the at least one fiber optic ferrule 220 is a flexible pin, as will be described in detail below. The pin 300 may accommodate the imperfect mating geometry by deforming, as will be described in detail below. By deforming along its length, the pin 300 can accommodate an imperfect relationship between the mating face 260 and the pins 300 and/or the pin holes 302. By radially deforming, the pin 300 can accommodate an imperfect relationship between the pin 300 and the pin hole 302. By radially deforming, the pin 300 and the pin hole 302 can have an interference fit with each other.

As the pin 300 is radially flexible, the interference fit can allow the pin 300 to move within the pin hole 302 (e.g., of the female ferrule $220_F$) by the application of a force that is small enough not to interfere with the connecting and disconnecting of the fiber optic ferrules 220, 1220 and/or the connecting and disconnecting of the fiber optic connectors 200, 1200. In certain embodiments, the pin 300 includes a latch 330 to attach the pin 300 to the pin hole 302 (e.g., of the male ferrule $220_M$).

Figure 2:
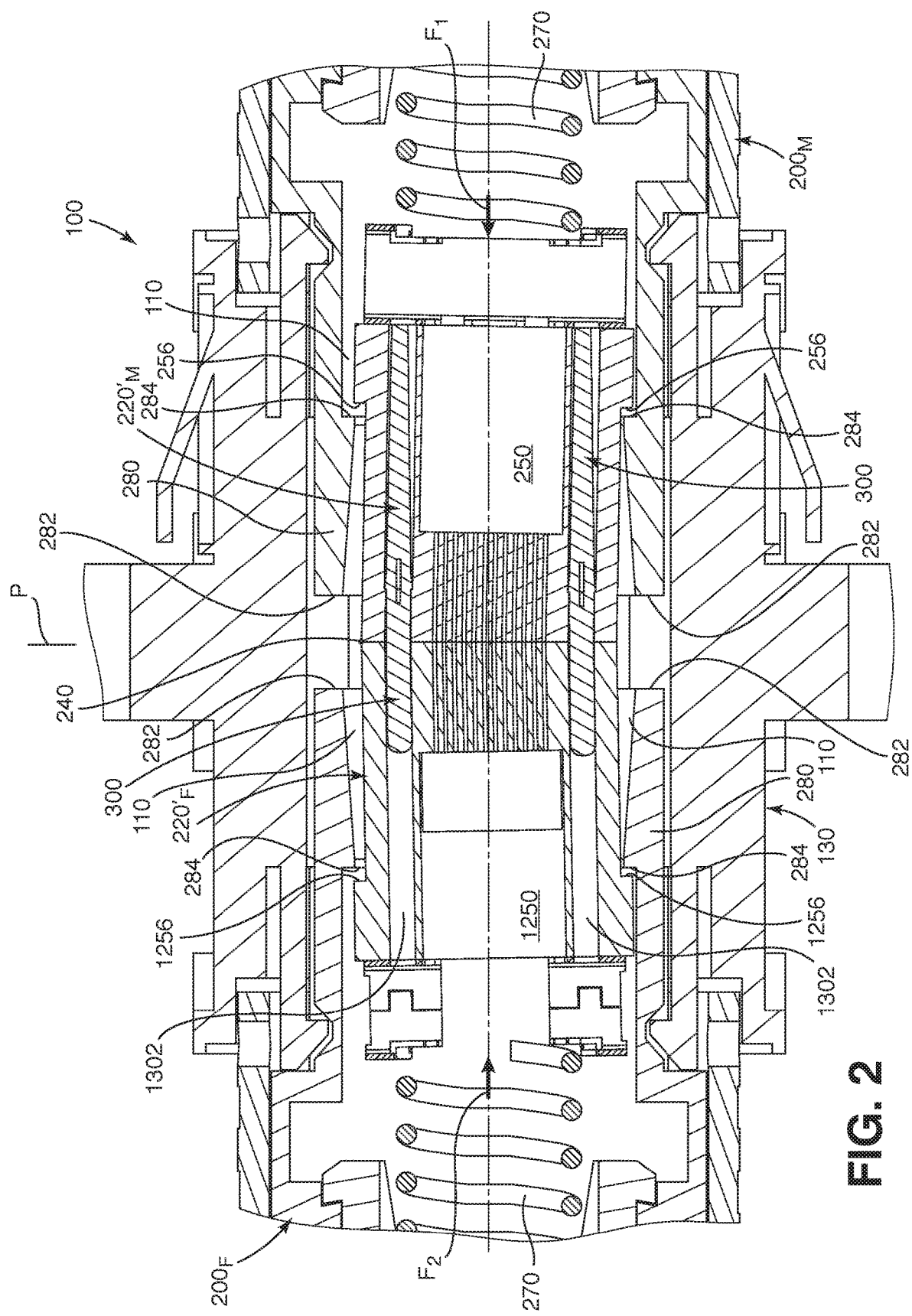
FIG. 2 is a partial cross-sectional plan view of the fiber optic connector assembly of FIG. 1, shown with the imperfect ferrules.

Referring now to FIGS. 1 and 2, the fiber optic connector assembly 100 is illustrated with the male fiber optic connector $200_M$ including an imperfect male ferrule $220'_M$ and the female fiber optic connector $200_F$ including an imperfect female ferrule $220'_F$. The imperfections of the imperfect male ferrule $220'_M$ and the imperfect female ferrule $220'_F$ are similar to an imperfect male ferrule $1220'_M$, illustrated at FIG. 11, and an imperfect female ferrule $1220'_F$, illustrated at FIG. 12. Even with imperfect geometry, the mating face 260 of the imperfect male ferrule $220'_M$ and the mating face 260 of the imperfect female ferrule $220'_F$ mate at the mating plane P (schematically illustrated at FIG. 2). A spring 270, included in each of the male fiber optic connector $200_M$ and the female fiber optic connector $200_F$, applies a sufficient spring force $F_1$ and $F_2$, respectively, that acts as a mating force and thereby mates the mating faces 260 together. The spring forces $F_1$ and/or $F_2$ are sufficient to deform the pin 300, if necessary, as the mating faces 260 are moved toward each other. Although the imperfect male ferrule $220'_M$ and the imperfect female ferrule $220'_F$ have imperfections, the imperfections may be less than a predetermined tolerance as will be further described below. A perfect or near perfect embodiment of a male ferrule $220_M$ is illustrated at FIGS. 20-32. In certain preferred embodiments, the spring force $F_1$, $F_2$ ranges from about 7.8 Newtons to about 11.8 Newtons. In certain embodiments, the spring force $F_1$, $F_2$, ranges from about 7.5 Newtons to about 12 Newtons.

Upon the mating force (e.g., the spring forces $F_1$ and/or $F_2$) urging the male ferrule $220'_M$, $1220'_M$, $220_M$, $1220_M$ together with the female ferrule $220'_F$, $1220'_F$, $220_F$, $1220_F$, a force couple may develop that results in a moment being applied to one or both of the ferrules $220'_M$, $1220'_M$, $220_M$, $1220_M$, $220'_F$, $1220'_F$, $220_F$, $1220_F$.

Figure 11:
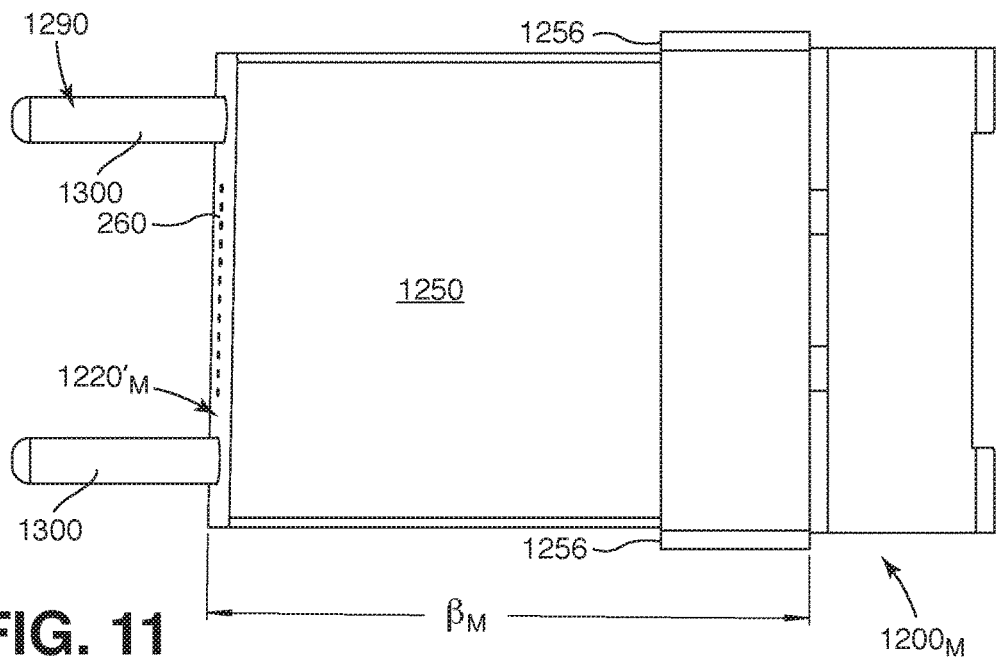
FIG. 11 is a plan view of the male ferrule of FIG. 5 of the male fiber optic connector of FIG. 3.
Figure 12:
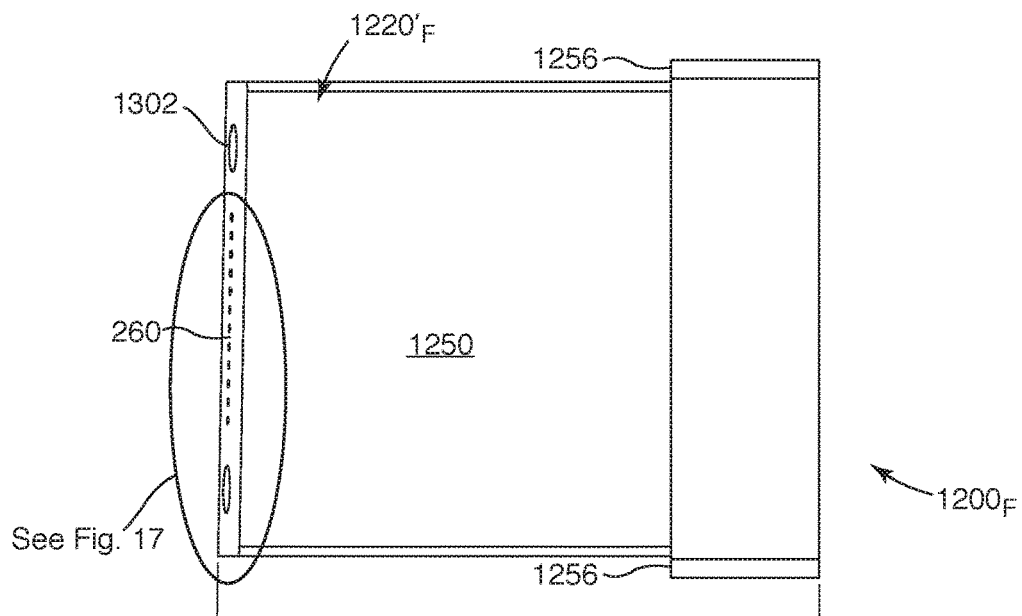
FIG. 12 is a plan view of the female ferrule of FIG. 5 of the female fiber optic connector of FIG. 3.

Ferrule imperfections include angular imperfections between the pin holes 302, 1302 and the pins 300, 1300 and the mating face 260, as illustrated at FIGS. 11 and 12. The pin 300 is adapted to accommodate such imperfections. As illustrated at FIGS. 1 and 2, the pins 300 can flex and thereby allow the pair of the mating faces 260 to mate even if this mating causes the pin holes 302, 1302 of the female ferrule $220_F$, $220_{FB}$, $1220_F$ to become non-collinear with the pin holes 302, 1302 of the male ferrule $220_M$, $220_{MB}$, $1220_M$.

Figure 41:
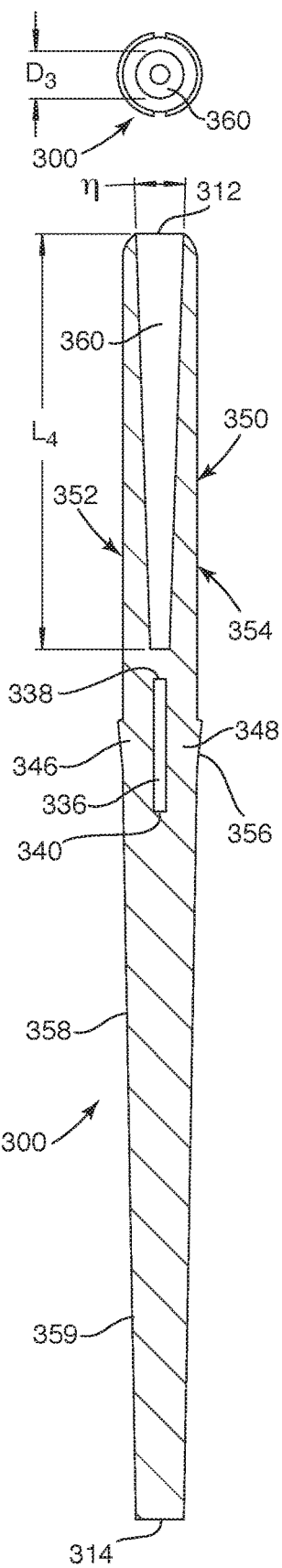
FIG. 41 is a cross-sectional top plan view of the pin of FIG. 25 but with an internal void included.

Ferrule imperfections may also include imperfections in the pin holes 302, 1302 (e.g. oversized, undersized, and irregularly sized holes). The pin 300 may be adapted to accommodate such imperfections. For example, as illustrated at FIGS. 41, 42, and 44, the pin 300 may include an internal void 360 that gives the pin 300 radial flexibility. The pin 300 may be made of a material that gives the pin 300 radial flexibility. In example embodiments, the pin 300 may be made of plastic, poly sulfanate, polyphenylene sulfide, hard engineered plastic, polycarbonate, carbon reinforced plastic, and/or plastic including nano particles. In example embodiments, the pin 300 is substantially made of a material with a modulus of elasticity of less than 5,000,000 pounds per square inch. In preferred embodiments, the pin 300 is made of a material with corrosion and/or chemical resistance. The pin 300 may have other features (e.g., slits, undulations, slots, radial holes, etc.) that give the pin 300 radial flexibility. The materials and the features that give the pin 300 radial flexibility may be used alone or in combination. The materials and the features that give the pin 300 radial flexibility may also give and/or contribute to bending flexibility of the pin 300. Likewise, the materials and the features that give the pin 300 bending flexibility may also give and/or contribute to radial flexibility of the pin 300. In situations where the pin hole 302 is oversized (e.g. from a manufacturing error, wear, etc.) the pin 300 may expand to snugly fit the pin hole 302. In situations where the pin hole 302 is undersized (e.g. from a manufacturing error, a burr, contamination, etc.) the pin 300 may compress to snugly fit the pin hole 302.

The pin 300 may be designed to accommodate pin holes 302 with a predetermined range of sizes (e.g., a hole tolerance). In accommodating the pin holes 302 with the largest size in the range (e.g., at a minimum material condition), the pin 300 should snugly fit in the pin hole 302. In accommodating the pin holes 302 with the smallest size in the range (e.g., at a maximum material condition), the pin 300 should slip within the pin hole 302 under a force small enough not to interfere with the proper mating of the pair of the mating faces 260. To achieve such a small sliding force, the pin 300 and/or the pin hole 302 may include a low coefficient of friction. The low coefficient of friction may be achieved by proper surface finish, surface treatment, material selection, etc.

In certain similar conventional fiber optic connectors, the pin holes 1302 of the ferrule body 1250 of a female ferrule 1220$_F$ are larger in size than the pin holes 1302 of the ferrule body 1250 of a male ferrule 1220$_M$ (see FIGS. 3-6). This allows the pin 1300 to have a tighter fit (e.g., a press fit) with the pin hole 1302 of the ferrule body 1250 of the male ferrule 1220$_M$ and a looser fit (e.g., a slip fit) with the pin hole 1302 of the ferrule body 1250 of the female ferrule 1220$_F$. The tight fit with the pin hole 1302 of the ferrule body 1250 of the male ferrule 1220$_M$ keeps the pin 1300 fixed to the male ferrule 1220$_M$, and the slip fit with the pin hole 1302 of the ferrule body 1250 of the female ferrule 1220$_F$ keeps the pin 1300 from getting stuck in the female ferrule 1220$_F$ and allows relative sliding between the pin hole 1302 and the pin 1300 which is needed to allow the pair of mating faces 260 to be moved together (i.e., mated) by the mating force.

As the pin 300 has radial flexibility and/or the latch 330 with the pin hole 302 of the male ferrule 220$_M$, 220$_{MB}$ (see FIGS. 24, 26, 37, and 40), the pin hole 302 can be the same pin hole 302 in both the male ferrule 220$_M$, 220$_{MB}$ and the female ferrule 220$_F$, 220$_{FB}$. The radial flexibility of the pin 300 allows the pin 300 to fit tightly (i.e., snugly) in pin holes 302 of different sizes without generating excessively loose or excessively tight fits. The latch 330 keeps the pin 300 with the male ferrule 220$_M$, 220$_{MB}$ up to a predetermined minimum pull-out force (e.g., 19.6 Newtons).

In certain embodiments, the ferrule body 1250 of the female ferrule 220$_F$ (see FIGS. 1 and 2) is replaced with the ferrule body 250 (see FIGS. 43 and 44). In certain embodiments, the ferrule body 250 of the female ferrule 220$_{FB}$ (see FIGS. 43 and 44) is replaced with the ferrule body 1250 (see FIGS. 1 and 2). In certain preferred embodiments, the male ferrule 220$_M$, 220$_{MB}$ is interconnectable and/or intermateable with a conventional female ferrule 1220$_F$ (see FIGS. 3-10). In certain preferred embodiments, the female ferrule 220$_F$, 220$_{FB}$ is interconnectable and/or intermateable with a conventional male ferrule 1220$_M$ (see FIGS. 3 and 4).

Figure 3:
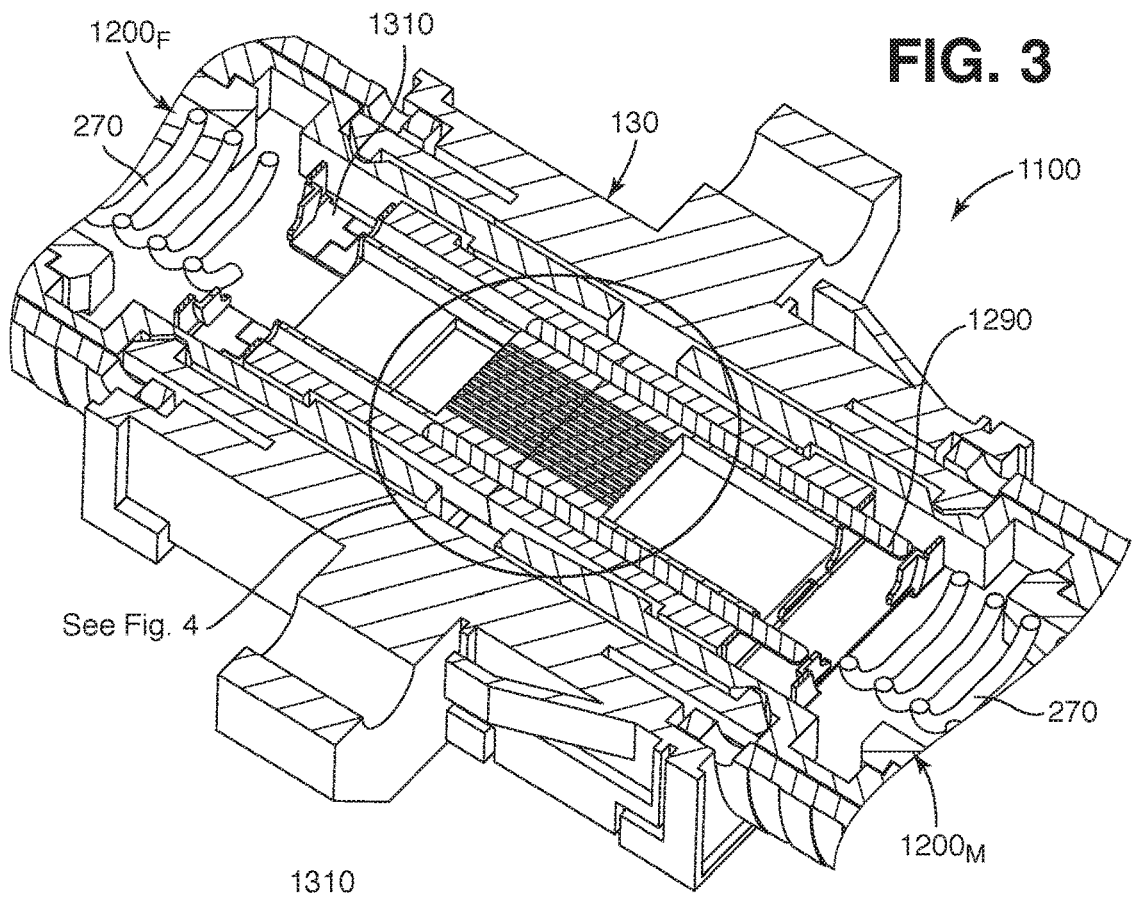
FIG. 3 is a partial perspective cross-sectional view of a fiber optic connector assembly including a fiber optic adapter, a male fiber optic connector shown with a perfect or near perfect male ferrule, and a female fiber optic connector shown with a perfect or near perfect female ferrule.

In certain embodiments, the pin 300 is installable into the conventional ferrule body 1250 (see FIGS. 3 and 4). Thus, the pin 300 can retrofit conventional male ferrules 1220M and provide existing fiber optic connector assemblies with at least some of the benefits mentioned herein. The latch 330 may act as a barb when the pin 300 is inserted into the pin hole 1302 of the conventional ferrule body 1250. The pin 300 may include multiple latches 330 or barbs and include multiple rows of latches 330 or barbs. The latch 330 or barb may grip the pin hole 1302 of the conventional ferrule body 1250. The latch 330 or barb may engage an existing feature of a pin hole of a conventional ferrule body. In certain embodiments, the conventional male ferrule 1220$_M$, retrofitted with the pin 300, is interconnectable and/or intermateable with the female ferrule 220$_F$, 220$_{FB}$ and/or the conventional female ferrule 1220$_F$.

Referring now to FIGS. 43 and 44, the fiber optic connector assembly 500 is illustrated with the male fiber optic connector 200$_{MB}$ and the female fiber optic connector 200$_{FB}$ assembled together with the spring clamp 530. Similar to the imperfect male ferrule 220'$_M$ and the imperfect female ferrule 220'$_F$ discussed above, imperfections of the male ferrule 220$_M$ and/or the female ferrule 220$_{FB}$, within a predetermined limit (i.e., a design tolerance), will not prevent the mating face 260 of the male ferrule 220$_M$ and the mating face 260 of the female ferrule 220$_{FB}$ from mating at the mating plane P when opposing spring forces $F_{1A}$, $F_{2A}$, $F_{1B}$, $F_{2B}$ from the spring clamp 530 are applied across the assembled fiber optic connectors 200$_{MB}$ and 200$_{FB}$. In particular, the opposing spring forces $F_{1A}$, $F_{2A}$, $F_{1B}$, $F_{2B}$ that the spring clamp 530 applies are sufficient spring forces $F_{1A}$, $F_{2A}$, $F_{1B}$, $F_{2B}$ that act as mating forces and thereby mate the mating faces 260 together. The opposing spring forces $F_{1A}$, $F_{2A}$, $F_{1B}$, $F_{2B}$ are sufficient to deform the pin 300 as the mating faces 260 are urged and moved toward each other. Although the male ferrule 220$_M$ and the female ferrule 220$_{FB}$ may have imperfections, the imperfections may be less than a predetermined tolerance. In certain preferred embodiments, each pair of the opposing spring forces $F_{1A}$, $F_{1B}$ and $F_{2A}$, $F_{2B}$ together range from about 7.8 Newtons to about 11.8 Newtons. In certain embodiments, each pair of the opposing spring forces $F_{1A}$, $F_{1B}$ and $F_{2A}$, $F_{2B}$ together range from about 7.5 Newtons to about 12 Newtons. A first spring force set $F_1$ of the opposing spring forces $F_{1A}$, $F_{2A}$, $F_{1B}$, $F_{2B}$ may be distributed and shared between a pair of fingers 540, 542 that act on the male fiber optic connector 200$_{MB}$. In the depicted example, spring force $F_{1A}$ is generated by the finger 542, and spring force $F_{1B}$ is generated by the finger 540. Likewise, a second spring force set $F_2$ of the opposing spring forces $F_{1A}$, $F_{2A}$, $F_{1B}$, $F_{2B}$ may be distributed and shared between a pair of fingers 550, 552 that act on the female fiber optic connector 200$_{FB}$. In the depicted example, spring force $F_{2A}$ is generated by the finger 552, and spring force $F_{2B}$ is generated by the finger 550.

Referring now to FIGS. 3-10, a fiber optic connector assembly 1100, similar to the fiber optic connector assembly 100, is illustrated. The fiber optic connector assembly 1100 includes the fiber optic adapter 130, a male fiber optic connector 1200$_M$, and a female fiber optic connector 1200$_F$. Unlike the fiber optic connector assembly 100, the fiber optic connector assembly 1100 does not have flexible pins. Instead, the fiber optic connector assembly 1100 includes conventional pins 1300. The conventional pins 1300 are typically made of steel or stainless steel. In comparison to the pins 300, the pins 1300 are inflexible, rigid, substantially rigid, etc. In particular, the conventional pins 1300 are substantially inflexible when under the load of the spring forces $F_1$, $F_2$, $F_{1A}$, $F_{2A}$, $F_{1B}$, $F_{2B}$.

As illustrated at FIGS. 3 and 4, the fiber optic connector assembly 1100, includes a perfect or near perfect example of the male ferrule 1220$_M$ and a perfect or near perfect example of the female ferrule 1220$_F$ that are mated at the mating plane P. In contrast with FIGS. 1-4, FIGS. 5 and 6 illustrate a pair of mating faces 260 that are not fully mated even though the male fiber optic connector 1200$_M$ and the female fiber optic connector 1200$_F$ are connected together by the fiber optic adapter 130. Unlike FIGS. 3 and 4, FIGS. 5 and 6 illustrate the male ferrule 1220$_M$ as the imperfect male ferrule 1220'$_M$ and the female ferrule 1220$_F$ as the imperfect female ferrule 1220'$_F$. When the imperfect male ferrule 1220'$_M$ and the imperfect female ferrule 1220'$_F$ are joined together, the pins 1300 of the imperfect male ferrule 1220'$_M$ are inserted into the pin holes 1302 of the imperfect female ferrule 1220'$_F$. As the pins 1300 are inflexible or substantially inflexible, the mating faces 260 are constrained at their imperfect angular orientations as the mating faces 260 are moved toward each other. Portions 1240 of the imperfect ferrules 1220'$_M$ and 1220'$_F$ contact each other before the mating faces 260 reach or fully reach the mating plane P. The springs 270 apply the spring force $F_1$, $F_2$ to the respective imperfect ferrules 1220'$_M$ and 1220'$_F$ as a mating force but are unable to mate the mating faces 260 and are unable to substantially deform the pins 1300.

Referring back to FIGS. 1 and 2, when the imperfect male ferrule 220'$_M$ and the imperfect female ferrule 220'$_F$ are joined together, the pins 300 of the imperfect male ferrule 220'$_M$ are inserted into the pin holes 302 of the imperfect female ferrule 220'$_F$. As the pins 300 are flexible, the mating faces 260 are not rigidly constrained at their imperfect angular orientations as the mating faces 260 are moved toward each other. Portions 240 of the imperfect ferrules 220'$_M$ and 220'$_F$ contact each other before the mating faces 260 reach or fully reach the mating plane P. The springs 270 apply the spring force $F_1$, $F_2$ to the respective imperfect ferrules 220'$_M$ and 220'$_F$ as a mating force and are able to mate the mating faces 260 and are able to substantially deform the pins 300.

Referring back to FIGS. 43 and 44, the spring clamp 530 is able to similarly mate the mating faces 260 and is able to substantially deform the pins 300.

The aforementioned force couple may be developed by compressive forces at the portions 240, 1240 of the ferrules 220'$_M$, 220'$_F$, 1220'$_M$, 1220'$_F$, 220$_M$, 220$_F$, 1220$_M$, 1220$_F$, and the mating forces (e.g., the spring forces $F_1$ and/or $F_2$). The portions 240, 1240 may include the ends 212 of the corresponding optical fibers 210. By deforming, the pins 300 may reduce a magnitude of the force couple and thereby the compressive forces at the portions 240, 1240. By deforming, the pins 300 may reduce the magnitude of the force couple and thereby may reduce the compressive forces at certain of the ends 212 of the corresponding optical fibers 210. By deforming, the pins 300 may reduce the magnitude of the force couple and thereby may improve uniform compressive loading among the ends 212 of the corresponding optical fibers 210.

Referring again to FIGS. 11-16, the unsuccessful mating of the mating faces 260 is illustrated in detail. FIG. 11 illustrates an angle ($\beta_M$ of the imperfect male ferrule 1220'$_M$, and FIG. 12 illustrates an angle ($\beta_F$ of the imperfect female ferrule 1220'$_F$. The angles ($\beta_M$, ($\beta_F$ schematically illustrate an angular error between the mating faces 260 and the pins 1300 and the pin holes 1302, respectively. The angles ($\beta_M$, ($\beta_F$ may be limited by a specified tolerance of the ferrules 1220$_M$ and 1220$_F$, respectively. The angles ($\beta_M$, ($\beta_F$ may include errors introduced during molding of the ferrules 1220$_M$ and 1220$_F$, respectively. The angles $\beta_M$, $\beta_F$ may include errors introduced during polishing the mating faces 260 of the ferrules 1220$_M$ and 1220$_F$, respectively. The angles $\beta_M$, $\beta_F$ may include errors introduced by the pin holes 1302 of the ferrules 1220$_M$ and 1220$_F$, respectively. The angles $\beta_M$, $\beta_F$ may be oriented differently than what is shown at FIGS. 11 and 12, respectively. The specified tolerance of the angles $\beta_M$, $\beta_F$ may be 0.1 degree, 0.2 degree, 0.5 degree, or some other value.

Figure 13:
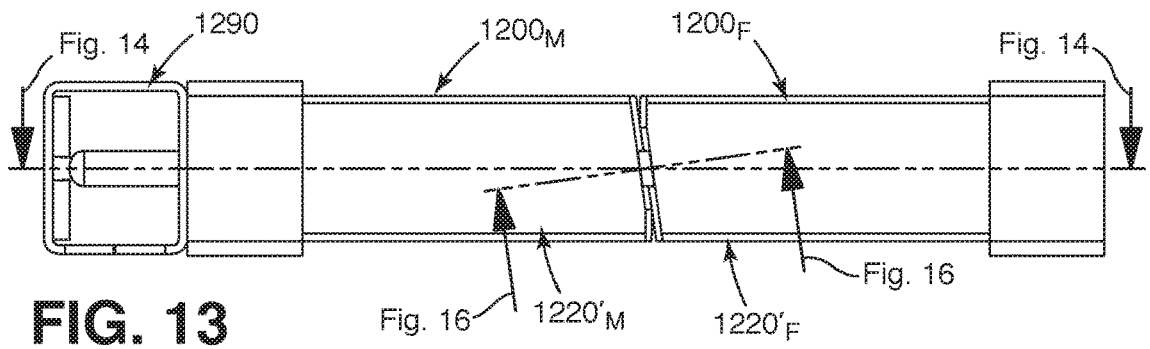
FIG. 13 is a side view of an assembly of the male ferrule of FIG. 11 connected with the imperfect female ferrule of FIG. 12.
Figure 20:
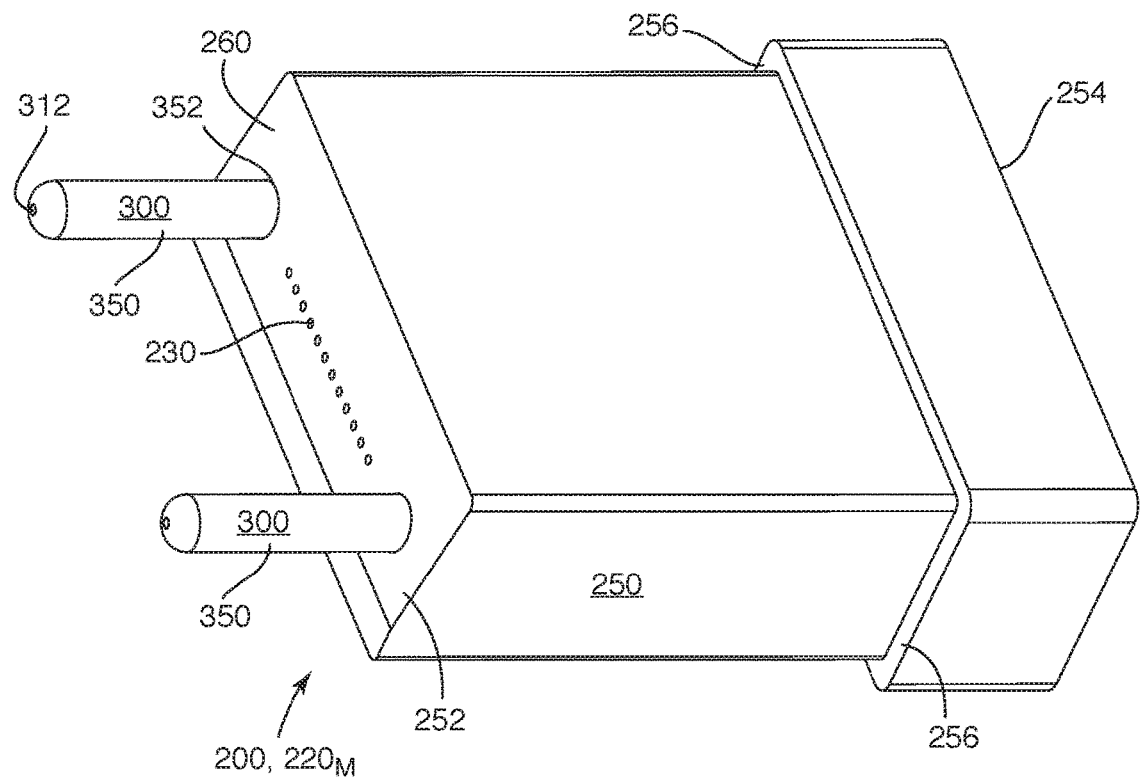
FIG. 20 is a perspective view of the male ferrule of FIG. 1 but shown as perfect or near perfect.
Figure 21:
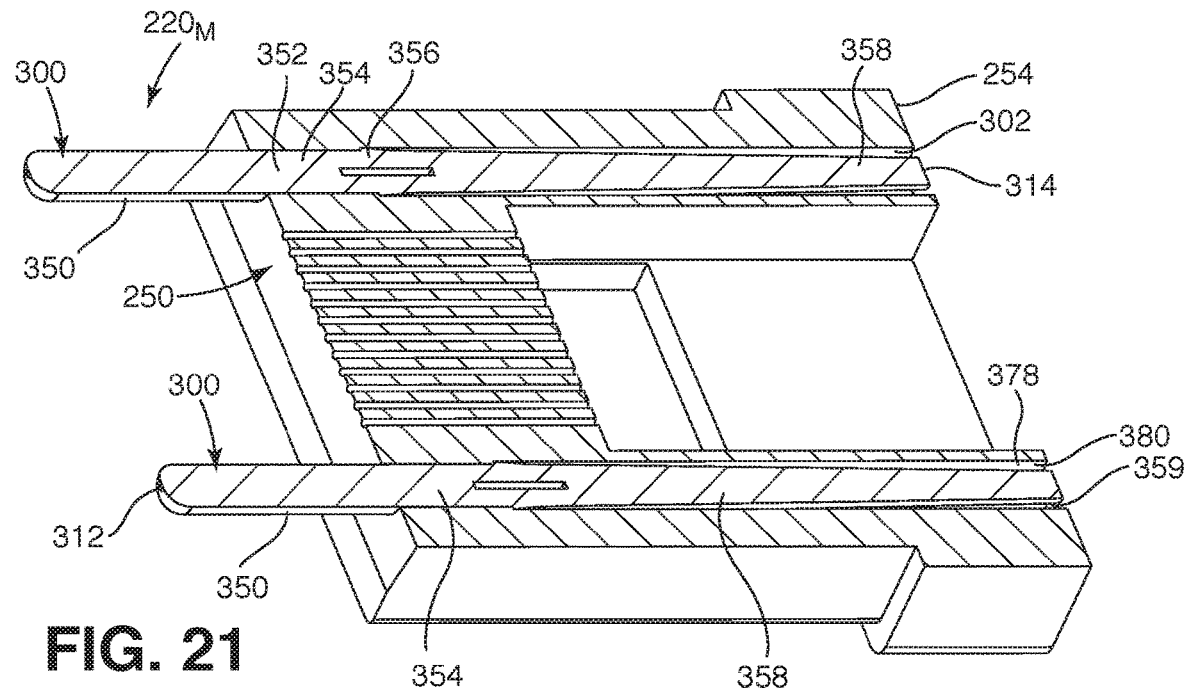
FIG. 21 is the perspective view of FIG. 20 but with the male ferrule cross-sectioned.
Figure 22:
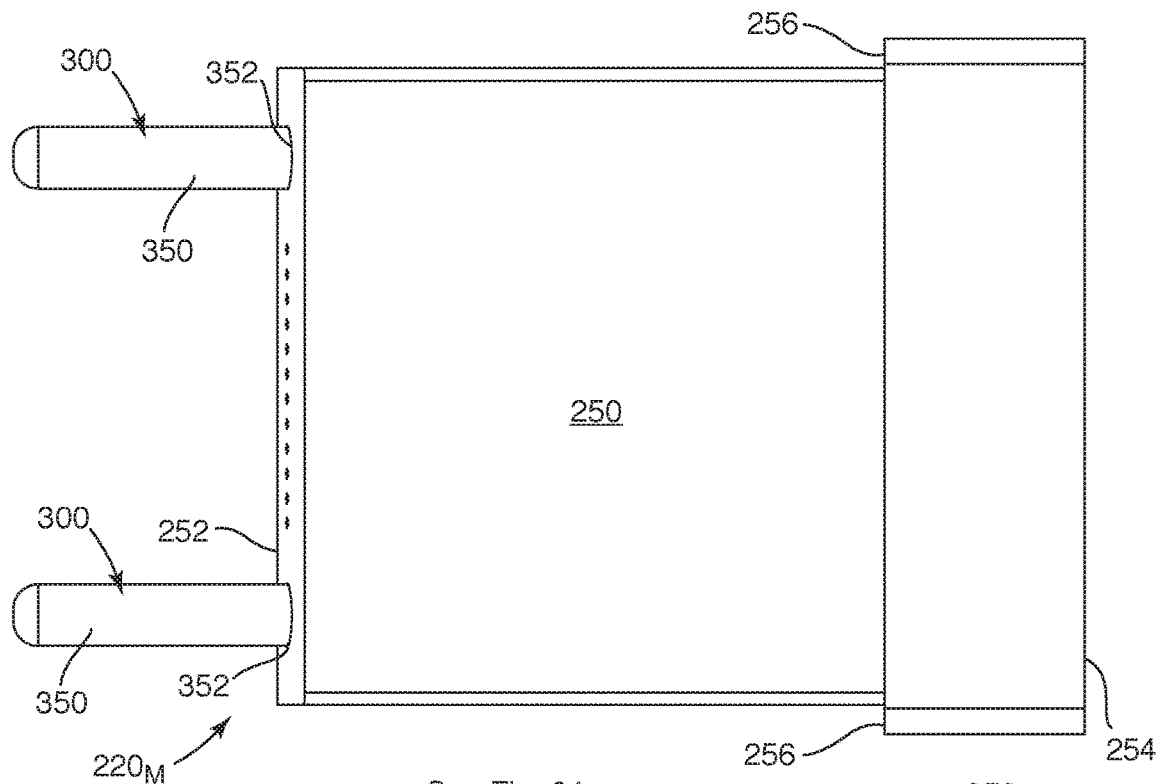
FIG. 22 is a top plan view of the male ferrule of FIG. 20.
Figure 23:
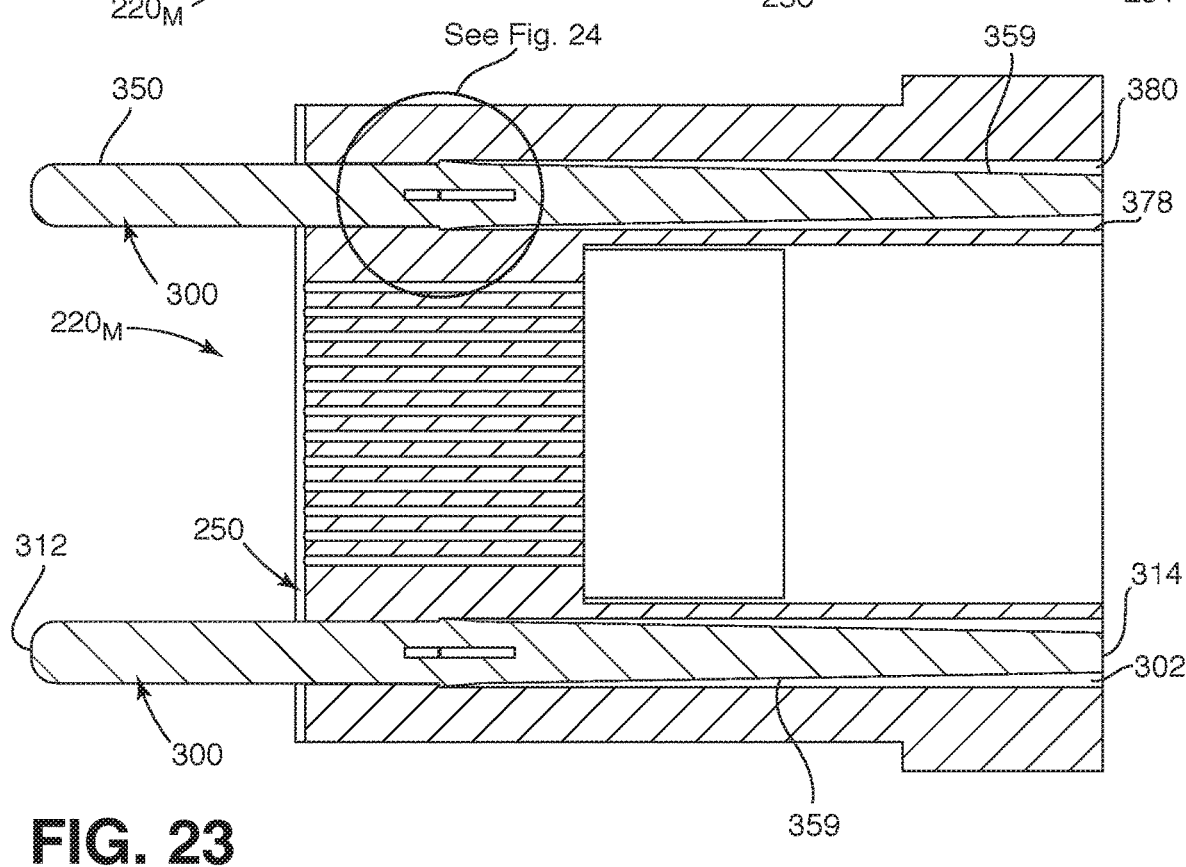
FIG. 23 is the top plan view of FIG. 22 but with the male ferrule cross-sectioned.
Figure 24:
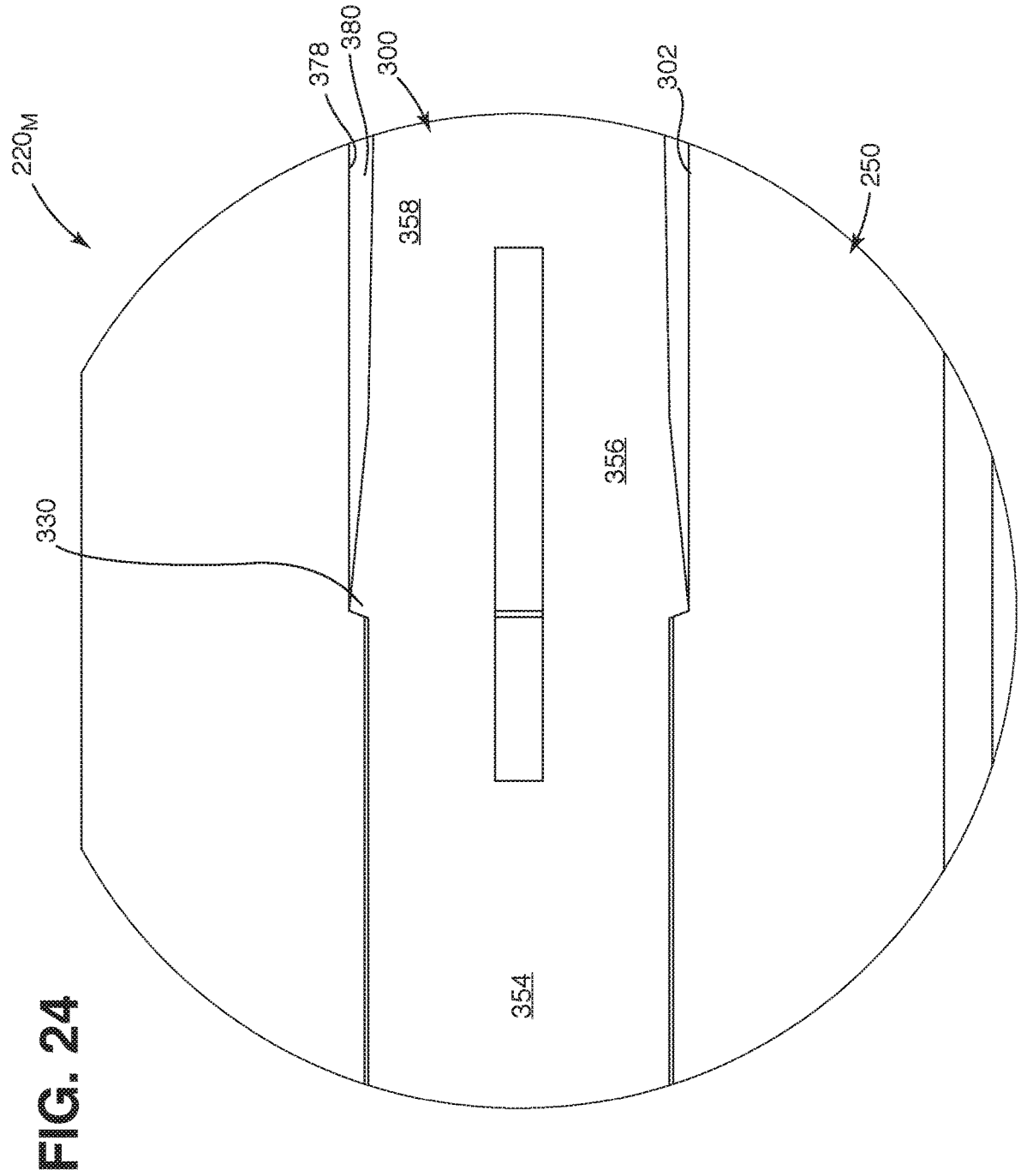
FIG. 24 is an enlarged portion of FIG. 23.

FIG. 13 shows the imperfect male ferrule 1220'$_M$ and the imperfect female ferrule 1220'$_F$ assembled. FIGS. 14 and 16 are cross-sectional views of FIG. 13 that illustrate the contacting portions 1240. As the ferrules 1220$_M$ and 1220$_F$ may undergo processing on the same or similar equipment, they may include the same or similar imperfections. This may lead to substantially doubling the effect of the imperfections at the assembly level. For example, the angles $\beta_M$, $\beta_F$ may each be about 0.1 degree, and an angle $\gamma$, illustrated at FIG. 16, may therefore be about 0.2 degree. Likewise, an example corresponding projected distance $L_2$ from the end 212 of one of the optical fibers 210 to the mating plane P may be 0.008 millimeter (see FIG. 17), and a corresponding gap G at the assembly level may be 0.016 millimeter (see FIG. 16). As illustrated, the example distance $L_2$ and the gap G are taken at the end 212 of the one of the optical fibers 210 that is a farthest distance $L_1$ from the contacting portions 1240. As illustrated, the contacting portions 1240 are at sides of the ferrules 1220'$_M$, 1220'$_F$. In ferrules with recesses adjacent the pin holes 1302, contacting portions may form that are spaced away from the sides of the ferrules 1220'$_M$, 1220'$_F$.

In the example assembly illustrated at FIG. 13, the imperfect male ferrule 1220'$_M$ and the imperfect female ferrule 1220'$_F$ each have similar imperfections. In other example assemblies, the imperfect male ferrule 1220'$_M$ and the imperfect female ferrule 1220'$_F$ may each have dissimilar imperfections. In still other example assemblies, the imperfect male ferrule 1220'$_M$ may be mated to a perfect or near perfect female ferrule 1220$_F$. In yet other example assemblies, the imperfect female ferrule 1220'$_F$ may be mated to a perfect or near perfect male ferrule 1220$_M$. Likewise, in the example fiber optic connector assembly 100, illustrated at FIGS. 1 and 2, the imperfect male ferrule 220'$_M$ and the imperfect female ferrule 220'$_F$ each have similar imperfections. In other example assemblies, the imperfect male ferrule 220'$_M$ and the imperfect female ferrule 220'$_F$ may each have dissimilar imperfections. In still other example assemblies, the imperfect male ferrule 220'$_M$ may be mated to a perfect or near perfect female ferrule 220$_F$. In yet other example assemblies, the imperfect female ferrule 220'$_F$ may be mated to a perfect or near perfect male ferrule 220$_M$. The pins 300 can accommodate the mating of various ferrules with various combinations of imperfection, including those listed above.

FIG. 15 illustrates forcing the imperfect male ferrule 1220'$_M$ and the imperfect female ferrule 1220'$_F$ together along the pins 1300. Upon forcing the mating faces 260 together, the pins 1300 interfere with the pin holes 1302 and may thereby damage (e.g., permanently deform, wear, etc.) the pin holes 1302. Also, excessive forcing loads may be transmitted to the contacting portions 1240 and thereby damage the mating faces 260 adjacent the contacting portions 1240. In addition, upon forcing the mating faces 260 together, the imperfect female ferrule 1220'$_F$ may shift relative to the imperfect male ferrule 1220'$_M$ and thereby compromise or ruin the fiber alignment. In the example depicted at FIG. 15, the imperfect female ferrule 1220'$_F$ may shift upward relative to the imperfect male ferrule $1220'_M$. By shifting upward, corresponding fiber holes 1230, and thereby the corresponding optical fibers 210 of the imperfect male ferrule $1220'_M$ and the imperfect female ferrule $1220'_F$ may become misaligned at the mating faces 260 (i.e., at the corresponding ends 212). The pin holes 302, 1302 may not necessarily be rigid or substantially rigid and may deform under the load of the pin 300, 1300. The deformation may be elastic, plastic, and/or a combination of elastic and plastic.

FIGS. 18 and 19 illustrate a pin assembly 1290 that includes two of the pins 1300 and a clip 1310. The clip 1310 joins the two pins 1300. The clip 1310 may further stiffen the pins 1300 by adding a constrained end condition to the pins 1300. The clip 1310 may also serve as a spring push of the spring 270 either separately or as part of the pin assembly 1290 (see FIGS. 3 and 5). The clip 1310 occupies a length along the male fiber optic connector $1200_M$ and the female fiber optic connector $1200_F$ and may result in added overall length to the connectors $1200_M$, $1200_F$.

Referring again to FIGS. 1, 2, 43, and 44, the male ferrule $220_M$ can be used in the male fiber optic connectors $200_M$ with a connector housing 280 (see FIGS. 1 and 2) and in the male fiber optic connector $200_{MB}$, without a connector housing (see FIGS. 43 and 44), and the female ferrule $220_F$, $220_{FB}$ can be used in the female fiber optic connectors $200_F$ with the connector housing 280 (see FIGS. 1 and 2) and in the female fiber optic connector $200_{FB}$, without a connector housing (see FIGS. 43 and 44). When used with the connector housings 280 and the fiber optic adapter 130, the connector housings 280 form a cavity 110 in which the mated ferrules $220_M$ and $220_F$ or $220_{FB}$ can float. In particular, shoulders 284 of the connector housing 280 retain shoulders 256, 1256 of the ferrule bodies 250, 1250, which are loaded by the spring 270, when the fiber optic connectors $200_M$, $200_F$ are not both installed together in the fiber optic adapter 130. Upon installing both of the fiber optic connectors $200_M$, $200_F$ together in the fiber optic adapter 130, the mating faces 260 mate and lift the shoulders 256, 1256 of the ferrule bodies 250, 1250 off of the shoulders 284 of the connector housing 280 as the springs 270 are compressed and thereby allow the mated ferrules $220_M$ and $220_F$ or $220_{FB}$ to float. A space is formed between distal ends 282 of the connector housings 280 upon installing both of the fiber optic connectors $200_M$, $200_F$ together in the fiber optic adapter 130. This floating substantially structurally decouples the mated ferrules $220_M$ and $220_F$ or $220_{FB}$ from the fiber optic connectors $200_M$, $200_F$.

Referring again to FIGS. 20-35, the male ferrule $220_M$ is illustrated in detail. As depicted, the male ferrule $220_M$ includes the ferrule body 250 and a pair of the pins 300. The ferrule body 250 extends from a first end 252 to a second end 254 (see FIG. 33) and includes the mating face 260 at the first end 252. The ferrule body 250 further includes a pair of the pin holes 302 that extend from the first end 252 to the second end 254. When the pins 300 are assembled into the male ferrule $220_M$, the pin holes 302 mount the pins 300. When serving as the female ferrule $220_{FB}$ (see FIGS. 43 and 44), the pair of the pin holes 302 may receive the pins 300 of the male ferrule $220_M$. In embodiments illustrated at FIGS. 1, 2, 43, and 44, the female fiber optic connector $200_F$, with the connector housing 280 (see FIGS. 1 and 2), and the female fiber optic connector $200_{FB}$, without a connector housing (see FIGS. 43 and 44), can use either the ferrule body 250 or the ferrule body 1250.

The ferrule body 250 and the ferrule body 1250, include fiber holes 230 that extend to and through the mating face 260. The fiber holes 230 each hold one of the optical fibers 210. The pin holes 302 include an edge portion 372, a first pin holding portion 374, a catch 376, and a second pin holding portion 378. As illustrated at FIG. 34, the first pin holding portion 374 may define a diameter $D_1$, and the second pin holding portion 378 may define a diameter $D_2$. As depicted, the diameter $D_2$ is larger than the diameter $D_1$. An example dimension for the diameter $D_1$ is 0.7 millimeter, and an example dimension for the diameter $D_2$ is 0.75 millimeter. The catch 376 can be positioned between the first pin holding portion 374 and the second pin holding portion 378. The catch 376 can be defined between the diameter $D_1$ and the diameter $D_2$. As illustrated at FIG. 35, the catch 376 can define an angle $\delta_F$ relative to the first pin holding portion 374, and an example dimension for the angle $\delta_F$ is about 69 degrees. As depicted, the angle $\delta_F$ is an acute angle.

Figure 28:
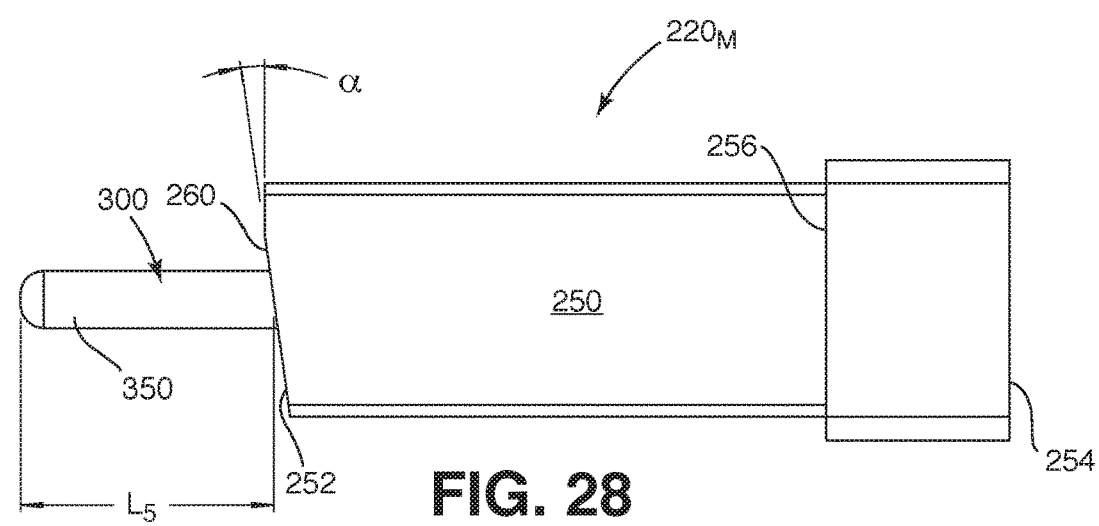
FIG. 28 is a side view of the male ferrule of FIG. 20.
Figure 29:
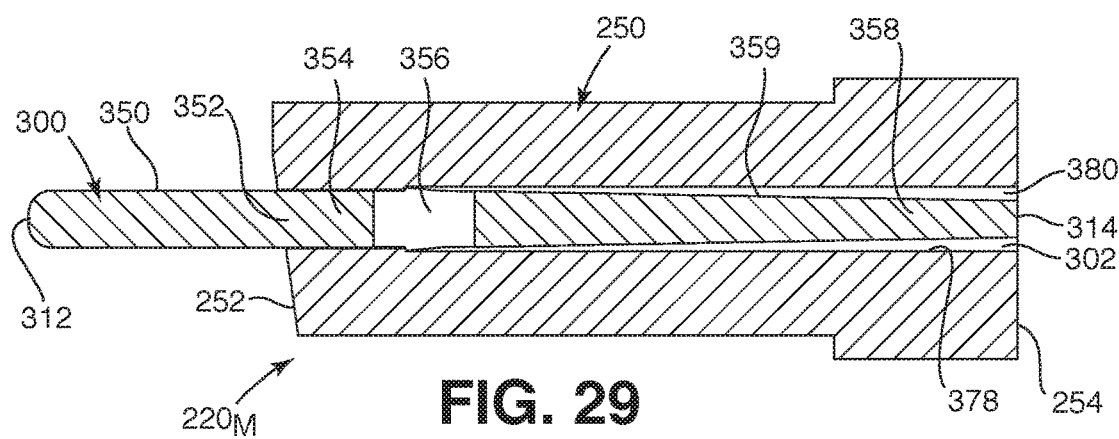
FIG. 29 is the side view of FIG. 28 but with the male ferrule cross-sectioned as called out at FIG. 27.

As illustrated at FIG. 28, the mating face 260 defines an angle $\alpha$ at the first end 252 of the ferrule body 250. As illustrated, the angle $\alpha$ is defined relative to a normal of a lengthwise direction of the pin hole 302 and therefore a normal of a lengthwise direction of the pin 300. In the depicted embodiment, the angle $\alpha$ is about 8 degrees. In other embodiments, the angle $\alpha$ is about 0 degrees (i.e., normal to the lengthwise directions of the pin 300 and/or the pin hole 302). Especially in embodiments with the angle $\alpha$ that is non-zero, the spring forces $F_1$ and/or $F_2$ can cause a lateral component of the mating forces to develop that urges a lateral movement between the mated ferrule bodies 250. Likewise, other mating forces can cause the lateral component of the mating forces to develop that urges the lateral movement between the mated ferrule bodies 250. The lateral movement may cause the abutted corresponding ends 212 to laterally move relative to each other and therefore degrade or disturb the optical connection (e.g., because of misalignment). As the optical fibers 210 may range from about 125 µm to about 250 µm in diameter in certain embodiments, a lateral movement of about 10 µm or so can significantly affect the optical connection. This lateral movement can be avoided or reduced or minimized to acceptable levels by the pin 300 fitting snugly within the pin hole 302 as describe herein. This lateral movement can also be avoided or reduced or minimized to acceptable levels by using a sufficiently low mating force. The sufficiently low mating force may still be sufficient to establish sufficient contact across the abutted corresponding ends 212 by using the pin 300 with sufficient flexibility to accommodate various imperfect geometries, as illustrated by the examples herein.

FIGS. 36-42 further illustrate the pin 300. The pin 300 extends from a first end 312 to a second end 314. The pin 300 includes a first portion 350 adjacent the first end 312, and a second portion 358 adjacent the second end 314. A held portion 354 of the pin 300 is illustrated as being held by the first pin holding portion 374, and the first portion 350 is illustrated extending beyond the ferrule body 250 when the pin 300 is assembled to the ferrule body 250. As illustrated at FIG. 28, the first portion 350 extends beyond the first end 252 of the ferrule body 250 by a distance $L_5$. An example dimension for the distance $L_5$ is 2.75 millimeters. A protruding portion 352 of the pin 300 is adjacent the held portion 354 and the first portion 350. The protruding portion 352 is adjacent the edge portion 372 of the pin hole 302 when the pin 300 is assembled to the ferrule body 250.

Figure 25:
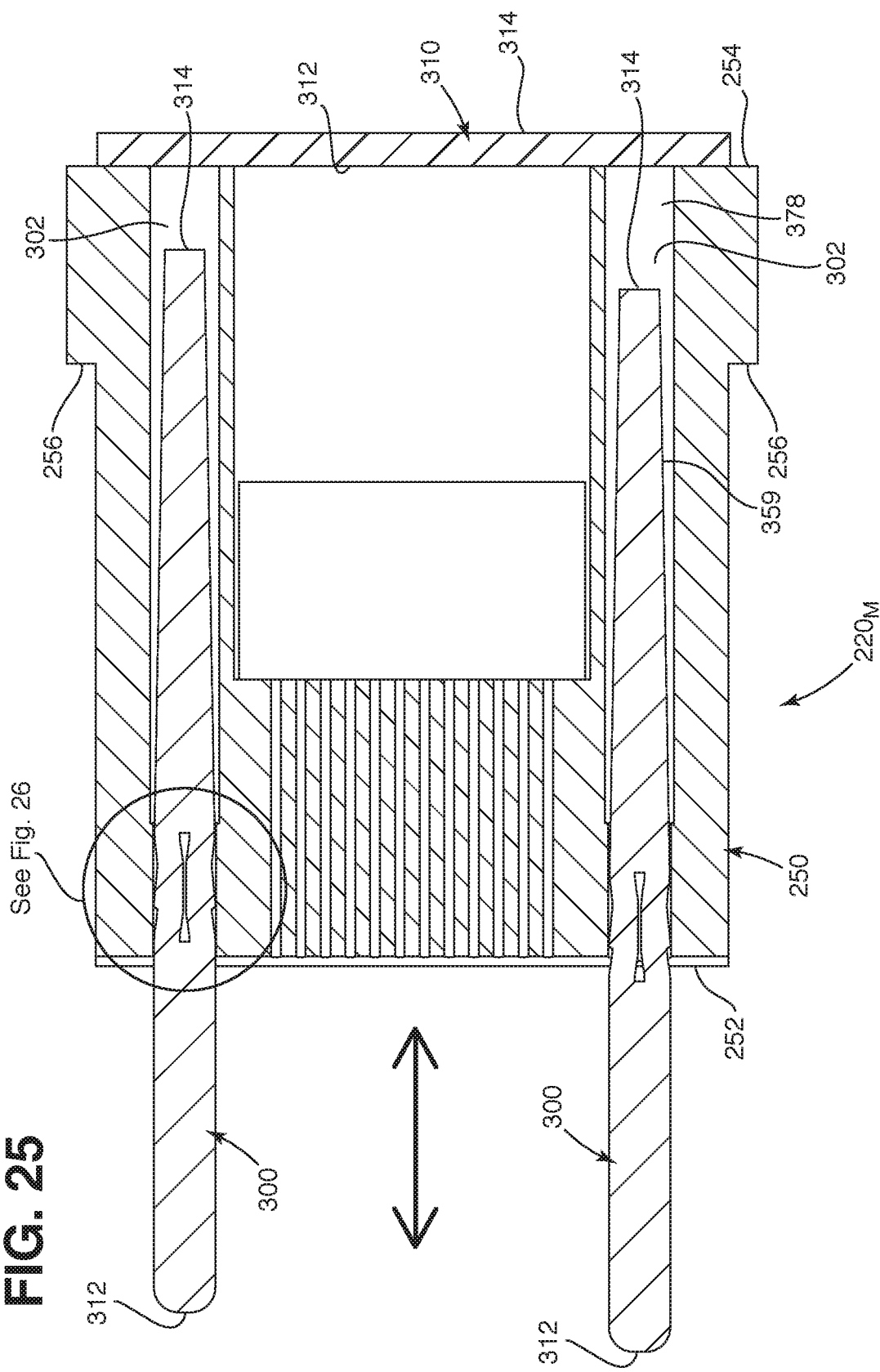
FIG. 25 is the cross-sectional view of FIG. 23 but with pins of the male ferrule partially removed and a pin-stop added.
Figure 26:
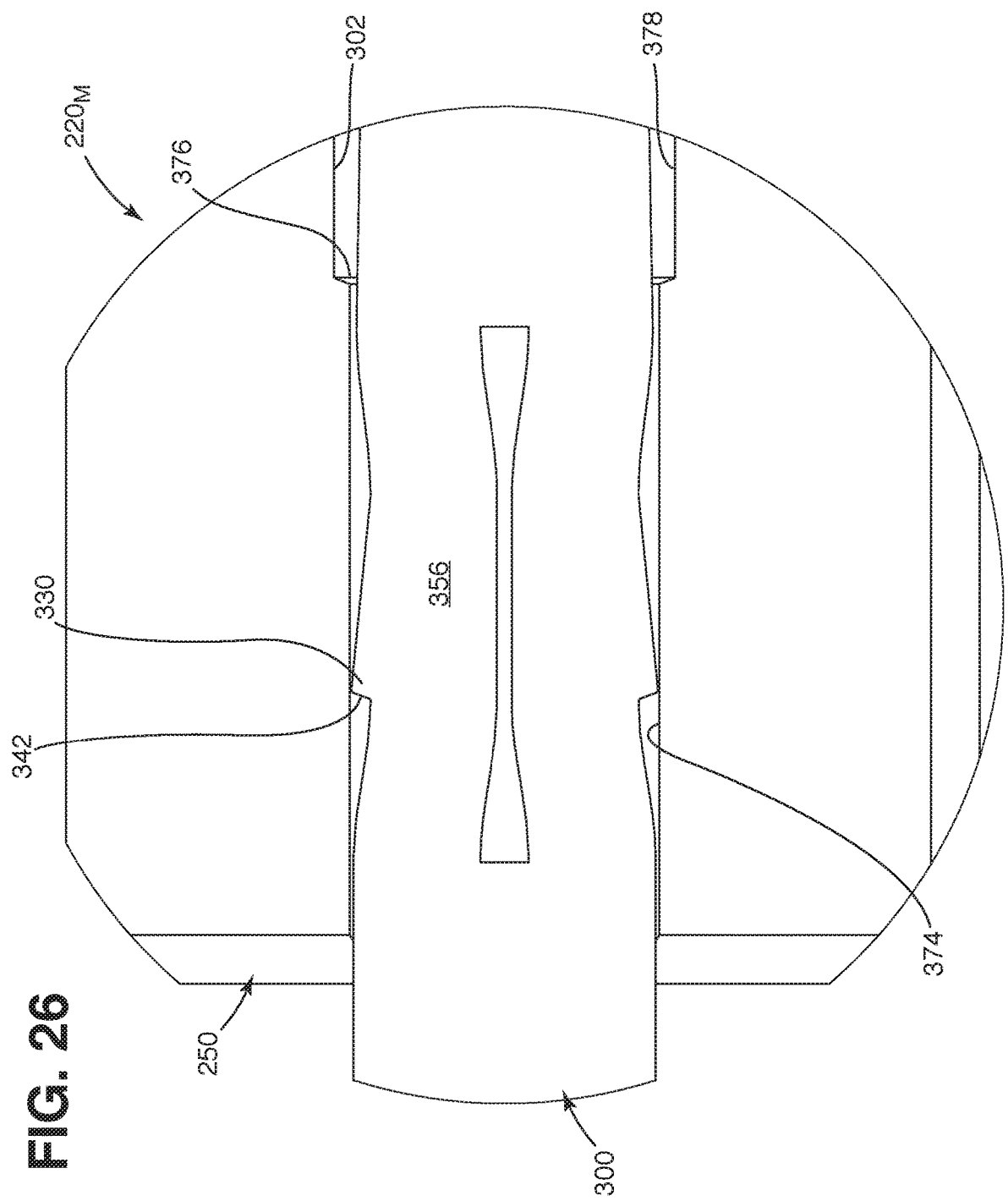
FIG. 26 is an enlarged portion of FIG. 25.
Figure 27:
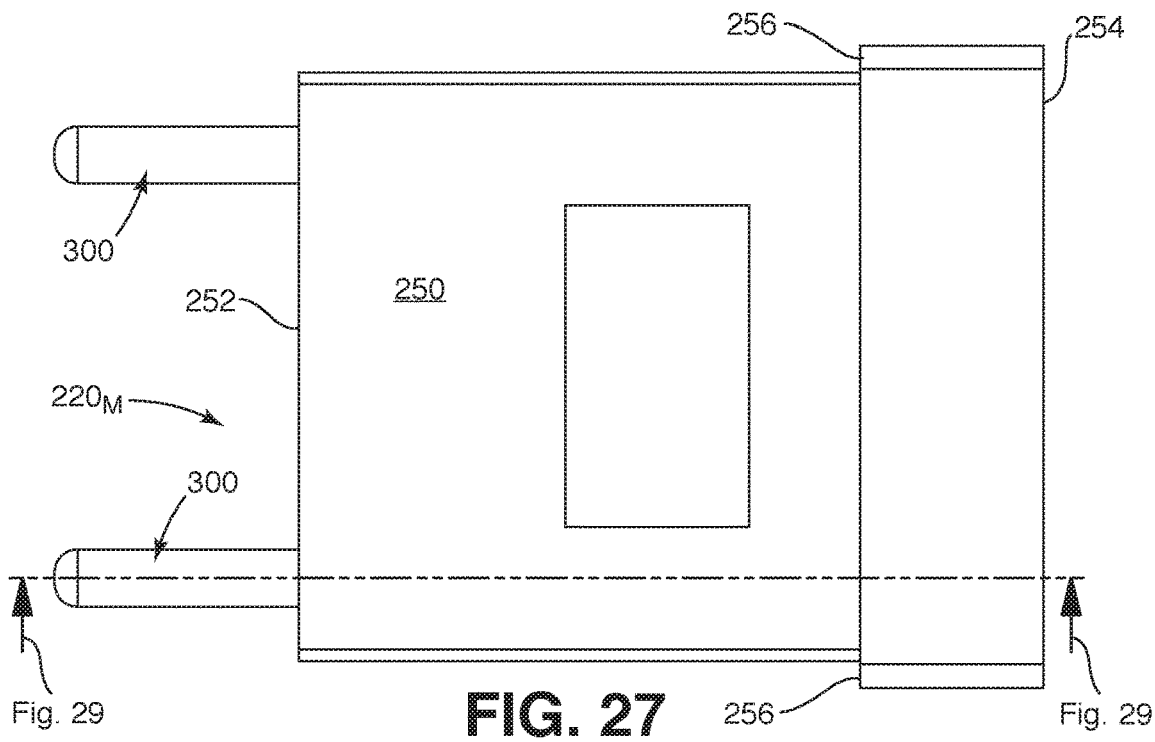
FIG. 27 is a bottom plan view of the male ferrule of FIG. 20.
Figure 40:
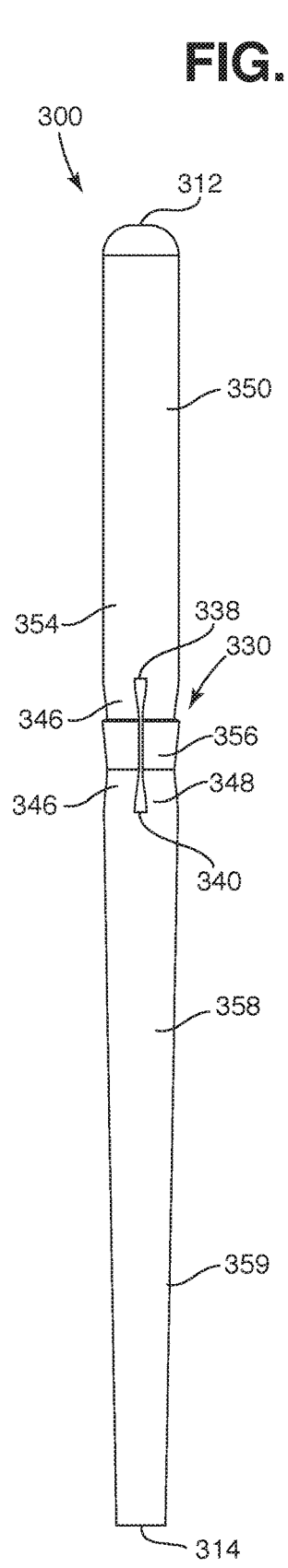
FIG. 40 is the top plan view of FIG. 36 but with the pin compressed as in FIGS. 25 and 26.

As depicted, a latching portion 356 of the pin 300 is positioned between the held portion 354 and the second portion 358. The latching portion 356 includes the latch 330, mentioned above. The latching portion 356 extends between a first end 332 and a second end 334. A void 336 may extend between a first end 338 and a second end 340 and through the latching portion 356 and define a first flexure 346 and a second flexure 348. As depicted, the first and the second flexures 346, 348 are positioned opposite each other. As depicted at FIGS. 25, 26, and 40, the first and the second flexures 346, 348 allow the latch 330 to be compressed within a diameter $D_P$ of the held portion 354 and/or the first portion 350 of the pin 300. The diameter $D_P$ can be about 0.7 millimeter. In certain embodiments, the diameter $D_P$ can range between 0.697 millimeter and 0.699 millimeter. The latch 330 includes a latching surface 342 that interfaces with the catch 376 of the pin hole 302 (see FIGS. 21, 23-26, 29, 32, and 37). The latching surface 342 defines an angle $\delta_P$ with the held portion 354 and/or the first portion 350 of the pin 300. As depicted, an example angle for the angle $\delta_P$ is 111 degrees. To facilitate compressing the latch 330 upon insertion of the pin 300 into the pin hole 302, a taper 344 is provided on the latch 330. As depicted, the taper 344 defines an angle ε across a centerline of the pin 300 (see FIG. 36). As depicted, an example angle for the angle ε is 11 degrees. As depicted, the taper 344 and/or the latching surface 342 define a diameter $D_R$ about the centerline of the pin 300. As depicted, an example dimension for the diameter $D_R$ is 0.78 millimeter.

As depicted, the second portion 358 of the pin 300 is positioned between the latching portion 356 and the second end 314 of the pin 300. In the example embodiment, the second portion 358 includes a taper 359. As depicted, the taper 359 defines an angle θ across the centerline of the pin 300 (see FIG. 36). As depicted, an example angle for the angle θ is about 2 degrees. As depicted, the second portion 358 defines a diameter $D_T$ at the second end 314 of the pin 300 about the centerline of the pin 300. As depicted, an example dimension for the diameter $D_T$ is 0.4 millimeter.

As illustrated at FIGS. 1, 2, 21, 23, 24, 29, 32, and 44 an annular interface 380 is formed between the second portion 358 of the pin 300 and the second pin holding portion 378 of the pin hole 302. As depicted, the annular interface 380 is an annular clearance. In other embodiments, the annular interface 380 may include an annular clearance portion, an interference portion, a slip fit portion, a contacting portion, etc. The annular interface 380 may vary along the lengthwise direction of the pin 300. In certain embodiments, the annular interface 380, at least in part, may determine or influence the stiffness (i.e., the flexibility) of the pin 300 when installed in the ferrule body 250. In certain embodiments, the annular interface 380 may influence the stiffness of the pin 300 when installed in the ferrule body 250 to be variable and/or non-linear.

As illustrated at FIGS. 41 and 42, the internal void 360 opens outwardly through the first end 312 of the pin 360 at a diameter $D_3$. In other embodiments, the void 360 may reside entirely within the pin 360 or be plugged at the outward opening. In the depicted embodiment, the diameter $D_3$ is about 0.4 millimeter and is centered about the centerline of the pin 300. In the depicted embodiment, the internal void 360 extends within the pin 300 a length of $L_4$ from the first end 312 of the pin 360. In the depicted embodiment, the length $L_4$ is about 3.5 millimeters. In the depicted embodiment, the internal void 360 defines an angle η across the centerline of the pin 300 (see FIG. 41). As depicted, an example angle for the angle η is about 4 degrees. In certain embodiments, the internal void 360, at least in part, may determine or influence the stiffness (i.e., the flexibility) of the pin 300. As mentioned above, the internal void 360 also may determine or influence the radial flexibility of the pin 300, at least in the first portion 350, the protruding portion 352, and the held portion 354 of the pin 300.

Figure 39:
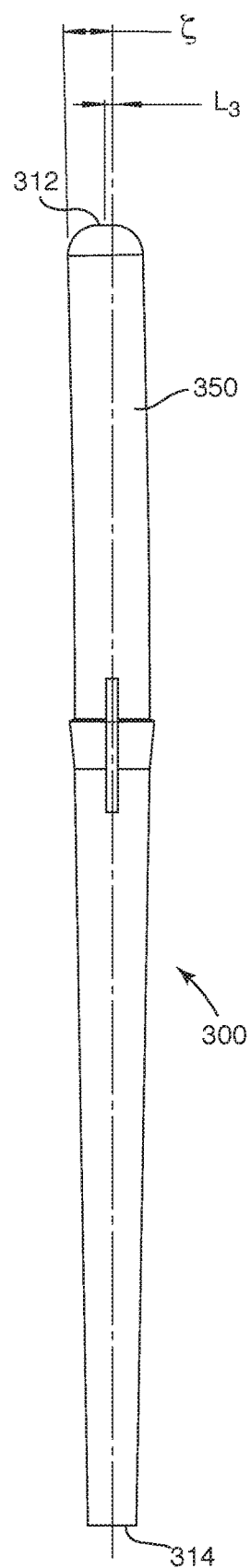
FIG. 39 is the top plan view of FIG. 36 but with the pin bent as in FIGS. 1 and 2.

FIG. 39 illustrates the pin 300 flexed similar to the flexing of the pin 300, under load, at FIGS. 1 and 2. In particular, a deformation angle ζ is defined at or near the first end 312 of the pin 360. In the depicted embodiments, the deformation angle ζ may range from about 0.12 degree to about 0.24 degree. Also illustrated at FIG. 39 is a deformation length $L_3$ defined at or near the first end 312 of the pin 360. In the depicted embodiments, the deformation length $L_3$ may range from about 0.022 millimeter to about 0.045 millimeter.

As illustrated at FIG. 25, a plate 310 may be positioned adjacent the second end 254 of the ferrule body 250. The plate 310 extends between a first face 312 and a second face 314. The first face 312 may abut the second end 254 of the ferrule body 250 and serve as a pin stop for the pins 300. When the pin 300 is fully installed in the pin hole 302 of the ferrule body 250, the second end 314 of the pin 300 may abut or be positioned adjacent the first face 312 of the plate 310. The spring 270 may push against the second face 314 of the plate 310. Thus, the plate 310 may also serve as a spring push plate. The plate 310 is substantially thinner than the clip 1310, illustrated at FIGS. 1 and 2. The plate 310 may therefore allow the overall length of the fiber optic connectors 200, $200_F$, $200_M$ to be reduced in comparison to the overall length of connectors 200, $200_F$, $200_M$ that use the clip 1310.

The pin 300 can be grouped in a pin set of multiple pins 300. The first portion 350 and/or the protruding portion 352 of each of the pins 300 of the pin set can be sized slightly differently to accommodate (i.e., match) a variety of sizes of the first pin holding portion 374 of the ferrule body 250 of the female fiber optic connectors $200_F$, $200_{FB}$ and/or the pin holes 1302 of the female ferrule $220_F$, $1220_F$ that may potentially be encountered due to manufacturing variations, design variation, and/or wear. Before connecting the male fiber optic connector $200_M$, $200_{MB}$, $1200_M$ to the particular female fiber optic connector $200_F$, $200_{FB}$, $1200_F$, the pins 300 from the pin set which best match the particular female fiber optic connector $200_F$, $200_{FB}$, $1200_F$ are selected and installed into the male fiber optic connector $200_M$, $200_{MB}$, $1200_M$. The pins 300 can be color coded to indicate the size of the pin 300.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:
1. A multi-fiber ferrule for terminating optical fibers, the multi-fiber ferrule comprising:
a ferrule body extending between a first end and a second end, the first end of the ferrule body including a mating face adapted to terminate ends of the optical fibers, the first end of the ferrule body also including a pin hole extending from the mating face; and
a pin extending between a first end and a second end along a central axis defined by the pin, the pin fixedly mounted within the pin hole of the ferrule body, a first portion of the pin extending outwardly away from the mating face of the ferrule body to the first end of the pin, the pin including a second tapered portion positioned within the pin hole, extending to the second end and tapering towards the central axis as it extends to the second end, the first portion of the pin being configured to be received in a pin hole defined by another ferrule body.

2. The multi-fiber ferrule of claim 1, wherein the pin includes a retention feature for retaining the pin within the pin hole.

3. The multi-fiber ferrule of claim 2, wherein the retention feature is positioned between the first end of the pin and the second tapered portion.

4. The multi-fiber ferrule of claim 3, wherein the retention feature includes a taper.

5. The multi-fiber ferrule of claim 1, wherein the second tapered portion defines an angle across the central axis of 2 degrees.

6. The multi-fiber ferrule of claim 5, wherein a diameter of the pin at the second end about the central axis is 0.4 mm.

7. The multi-fiber ferrule of claim 1, wherein the pin is removable from the pin hole of the ferrule body through the first end of the ferrule body.

8. The multi-fiber ferrule of claim 1, wherein the multi-fiber ferrule can be converted between a male configuration and a female configuration by installing and removing the pin from the first end of the ferrule body.

9. The multi-fiber ferrule of claim 2, wherein the retention feature is at least one barb that engages the pin hole of the ferrule body.

10. The multi-fiber ferrule of claim 9, wherein the pin hole of the ferrule body includes at least one catch that engages the at least one barb of the pin.

11. A multi-fiber ferrule for terminating optical fibers, the multi-fiber ferrule comprising:
a ferrule body extending between a first end and a second end, the first end of the ferrule body including a mating face adapted to terminate ends of the optical fibers, the first end of the ferrule body also including first and second pin holes extending from the mating face; and
first and second pins extending between first and second ends along central axes defined by the pins, the pins fixedly mounted within the first and second pin holes of the ferrule body, first portions of the pins including the first ends of the pins extending outwardly away from the mating face of the ferrule body to the first ends of the pins, the pins including second tapered portions extending to the second ends and tapering towards the central axes as they extend to the second ends, the first portions of the pins being configured to be received in pin holes defined by another ferrule body.

12. The multi-fiber ferrule of claim 11, wherein the pins include retention features for retaining the pins within the pin holes.

13. The multi-fiber ferrule of claim 12, wherein the retention features are positioned between the first ends of the pins and the second tapered portions.

14. The multi-fiber ferrule of claim 13, wherein the retention features each include a taper.

15. The multi-fiber ferrule of claim 11, wherein the tapered portions define angles across the central axes of 2 degrees.

16. The multi-fiber ferrule of claim 15, wherein diameters of the pins at the second ends about the central axis are 0.4 mm.

17. The multi-fiber ferrule of claim 11, wherein the pins are removable from the pin holes of the ferrule body through the first end of the ferrule body.

18. The multi-fiber ferrule of claim 11, wherein the multi-fiber ferrule can be converted between a male configuration and a female configuration by installing and removing the pins from the first end of the ferrule body.

19. The multi-fiber ferrule of claim 12, wherein the retention features are barbs that engage the pin holes of the ferrule body.

20. The multi-fiber ferrule of claim 19, wherein the pin holes of the ferrule body include catches that engage the barbs of the pins.

* * * * *